(12) United States Patent
Unger

(10) Patent No.: US 9,880,022 B1
(45) Date of Patent: Jan. 30, 2018

(54) POINT LAYOUT SYSTEM WITH THIRD TRANSMITTER

(71) Applicant: Trimble Navigation Limited, Sunnyvale, CA (US)

(72) Inventor: Eric Keith Unger, Tipp City, OH (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

(21) Appl. No.: 15/351,170

(22) Filed: Nov. 14, 2016

(51) Int. Cl.
*G01B 11/24* (2006.01)
*G01C 25/00* (2006.01)
*G01C 15/00* (2006.01)

(52) U.S. Cl.
CPC .......... *G01C 25/005* (2013.01); *G01C 15/002* (2013.01)

(58) Field of Classification Search
CPC ............................ G01C 25/005; G01C 15/002
USPC .................................................. 356/601–640
See application file for complete search history.

(56) References Cited

U.S. PATENT DOCUMENTS

| | | | |
|---|---|---|---|
| 4,029,415 A | 6/1977 | Johnson | |
| 4,035,084 A | 7/1977 | Ramsay | |
| 4,598,481 A | 7/1986 | Donahue | |
| 4,820,041 A | 4/1989 | Davidson | |
| 4,836,671 A | 6/1989 | Bautista | |
| 5,076,690 A | 12/1991 | deVos | |
| 5,100,202 A | 3/1992 | Hughes | |
| 5,100,229 A | 3/1992 | Lundberg | |
| 5,110,202 A | 5/1992 | Dornbusch | |
| 5,137,354 A | 8/1992 | deVos | |
| 5,243,398 A | 9/1993 | Nielsen | |
| 5,272,814 A | 12/1993 | Key | |
| 5,294,970 A | 3/1994 | Dornbusch | |
| 5,539,990 A | 7/1996 | Le | |
| 5,579,102 A | 11/1996 | Pratt | |
| 5,588,216 A | 12/1996 | Rank et al. | |
| 5,598,269 A | 1/1997 | Kitaevich | |

(Continued)

FOREIGN PATENT DOCUMENTS

DE 69122965 T2 3/1992
DE 69224671 T2 3/1994

(Continued)

OTHER PUBLICATIONS

Spectra Precision QML800 / QML800G QuickMark Layout User Guide; Published by Trimble Navigation Ltd, Apr. 2016. (45 pages).

(Continued)

*Primary Examiner* — Tri T Ton
(74) *Attorney, Agent, or Firm* — Frederick H. Gribbell; Aaron S. Brodsky

(57) ABSTRACT

A point layout system is described that identifies points and their coordinates, using laser transmitters that are attached to at least three base units. The laser transmitters rotate about the azimuth and emit vertical laser planes. After being setup using control points, the projection lines of the laser planes will intersect on the floor of a jobsite at any point of interest, under command of the user with a remote unit. Once the first two base units are registered with the virtual floor plan, the third base unit can be automatically setup, using an automatic procedure that creates alignment axes with the first two base units. Once all three base units are registered with the floor plan, any one of the three base units can then be moved to a new physical location on the jobsite floor, and the automatic setup routine can be used to register its new position.

20 Claims, 20 Drawing Sheets

(56) References Cited

U.S. PATENT DOCUMENTS

| | | |
|---|---|---|
| 5,864,956 A | 2/1999 | Dong |
| 5,983,510 A | 11/1999 | Wu et al. |
| 6,035,540 A | 3/2000 | Wu et al. |
| 6,140,957 A | 10/2000 | Wilson |
| 6,501,543 B2 | 12/2002 | Hedges |
| 6,545,751 B2 | 4/2003 | Beliveau |
| 6,763,595 B1 | 7/2004 | Hersey |
| 7,110,092 B2 | 9/2006 | Kasper |
| 7,148,958 B2 | 12/2006 | Ohtomo |
| 7,644,505 B2 | 1/2010 | Zeng |
| 7,679,727 B2 | 3/2010 | Benz et al. |
| 7,992,310 B2 | 8/2011 | Litvin |
| 8,087,176 B1 | 1/2012 | Hayes |
| 8,269,984 B2 | 9/2012 | Hinderling |
| 8,281,495 B2 | 10/2012 | Hayes |
| 8,307,562 B2 | 11/2012 | Bascom |
| 8,553,212 B2 | 10/2013 | Jaeger |
| 8,595,946 B2 | 12/2013 | Hayes |
| 2004/0177523 A1 | 9/2004 | Chang et al. |
| 2005/0102063 A1 | 5/2005 | Bierre |
| 2006/0179672 A1 | 8/2006 | Tacklind |
| 2006/0280212 A1 | 12/2006 | Lu et al. |
| 2012/0186088 A1 | 7/2012 | Amor |
| 2012/0198711 A1 | 8/2012 | Hayes |

FOREIGN PATENT DOCUMENTS

| | | |
|---|---|---|
| DE | 19527829 A1 | 1/1997 |
| DE | 19648626 A1 | 5/1998 |
| DE | 102011077080 | 12/2011 |
| EP | 2226610 A1 | 9/2010 |
| JP | 10239057 | 9/1998 |
| WO | WO 2009053085 | 4/2009 |

OTHER PUBLICATIONS

Spectra Precision QuickMark Layout White Paper; Published by Trimble Navigation Ltd, Apr. 2016. (9 pages).

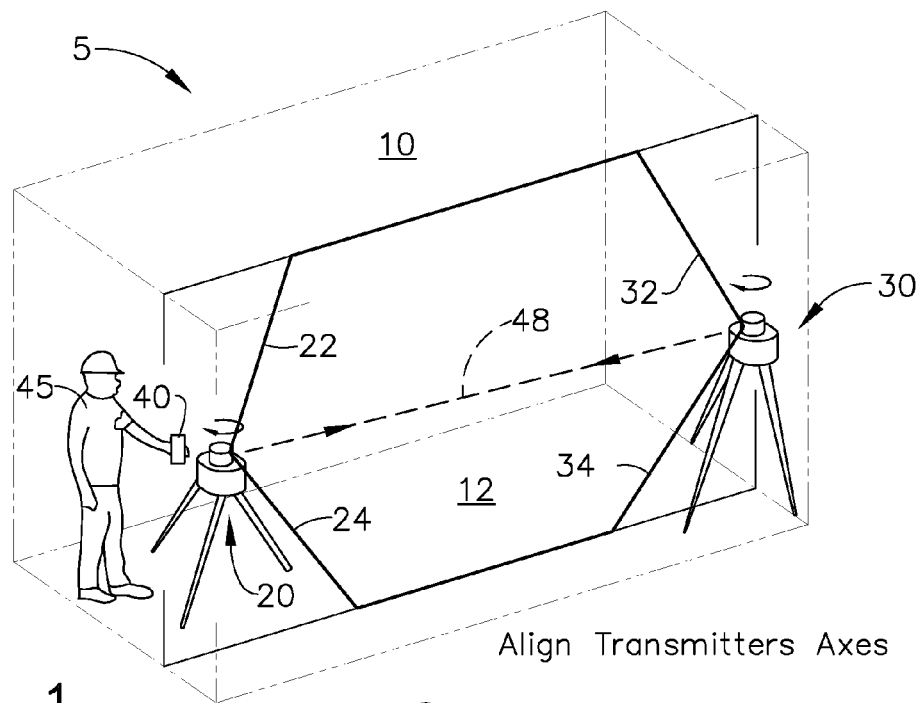
FIG. 1  Align Transmitters Axes
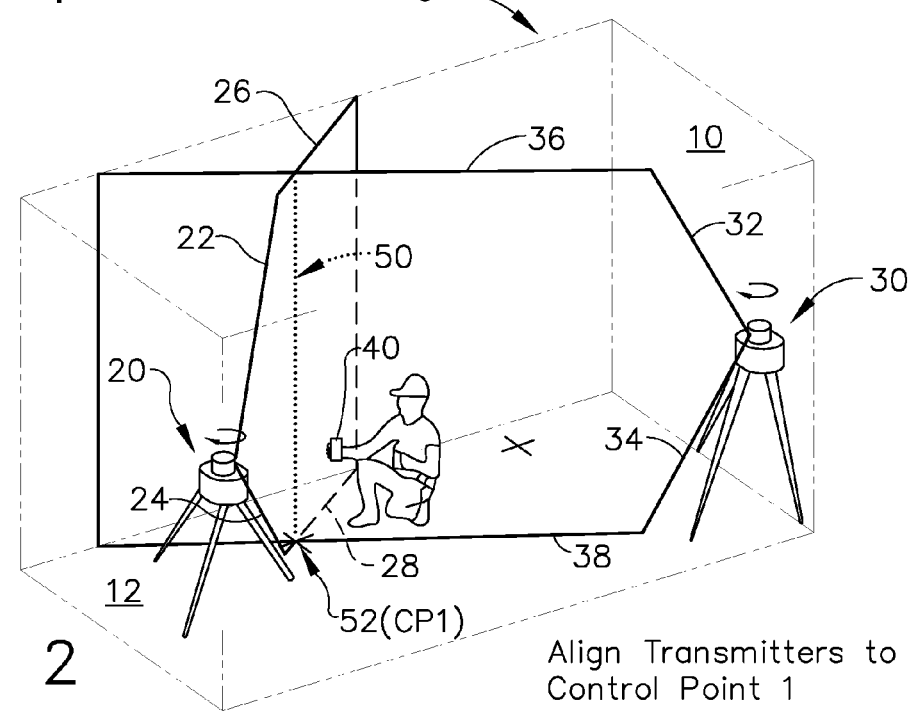
FIG. 2  Align Transmitters to Control Point 1

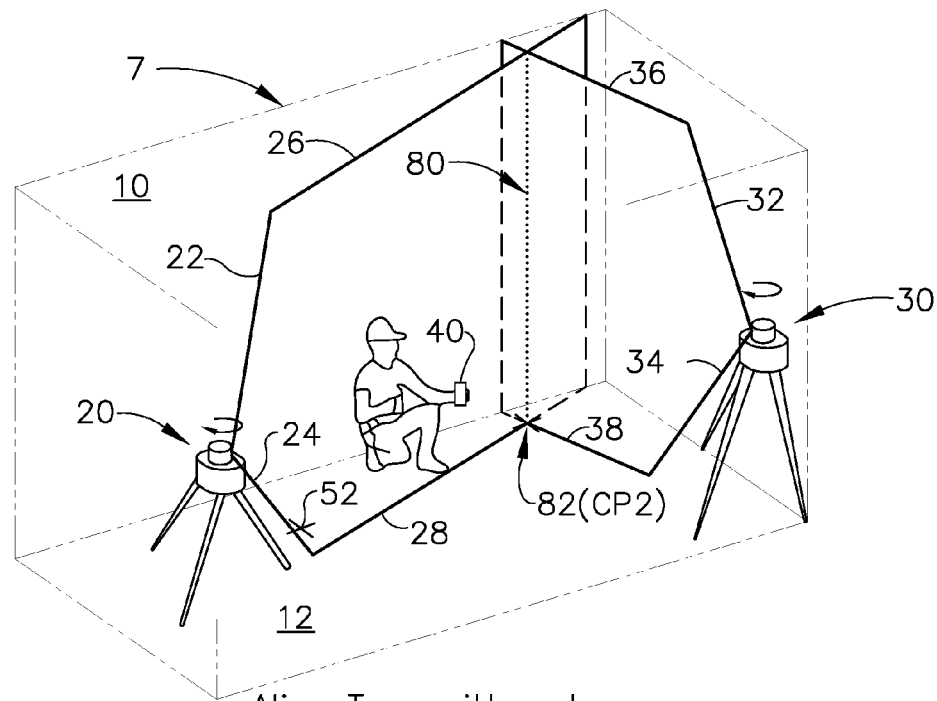
FIG. 3  Align Transmitters to Control Point 2
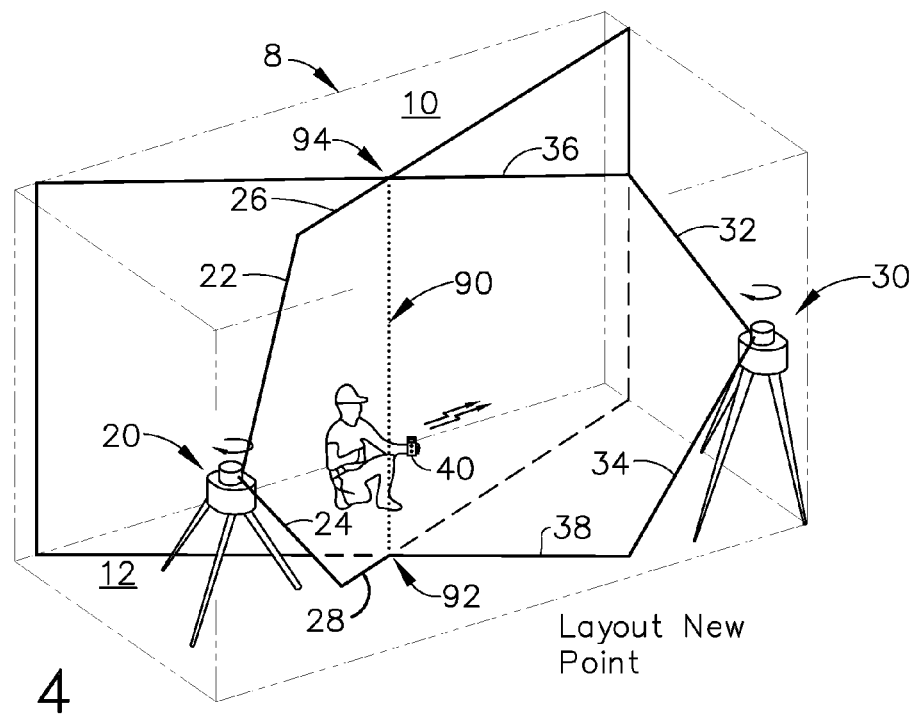
FIG. 4  Layout New Point

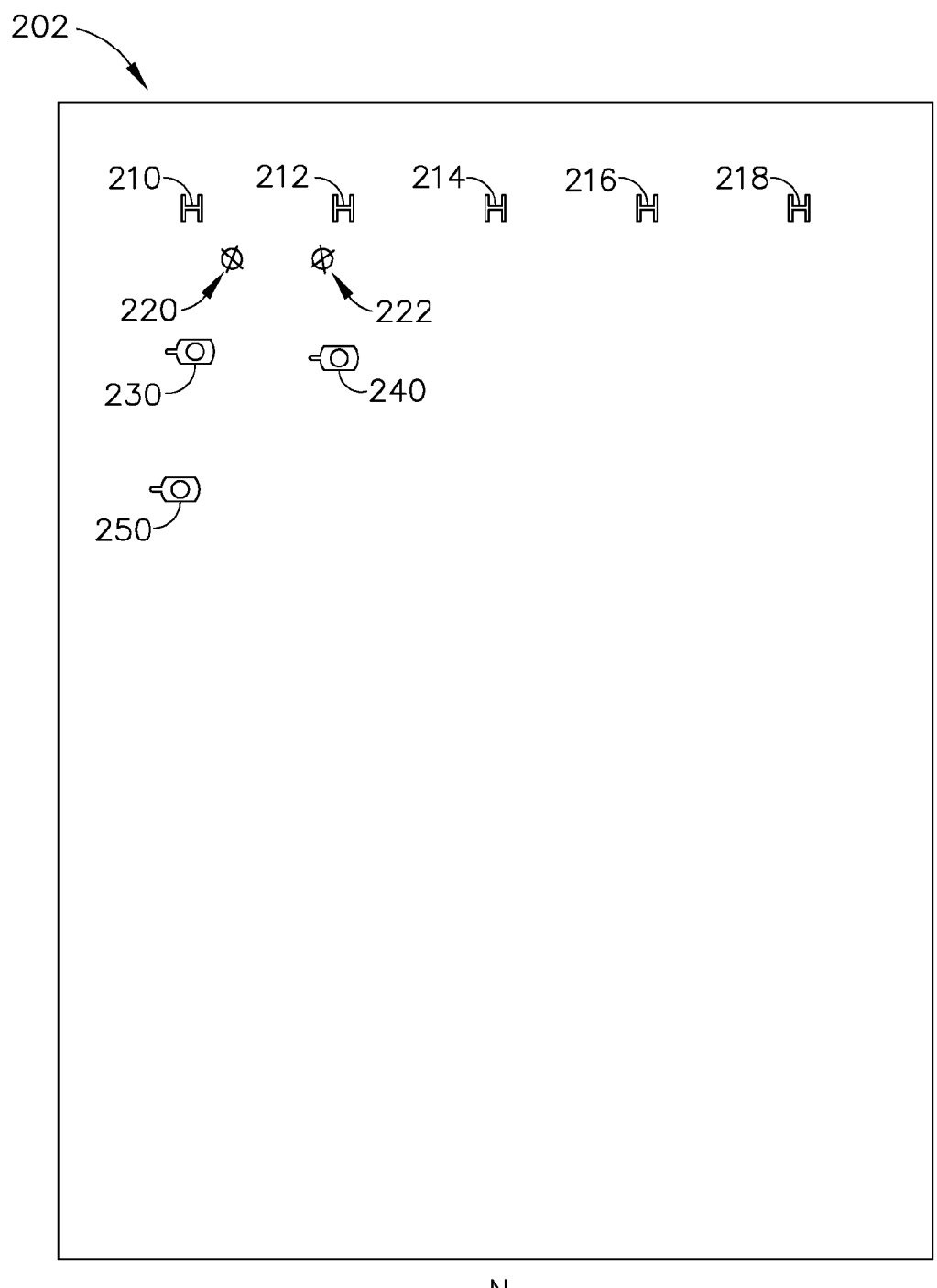
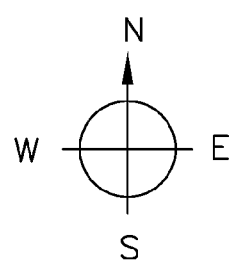
FIG. 19

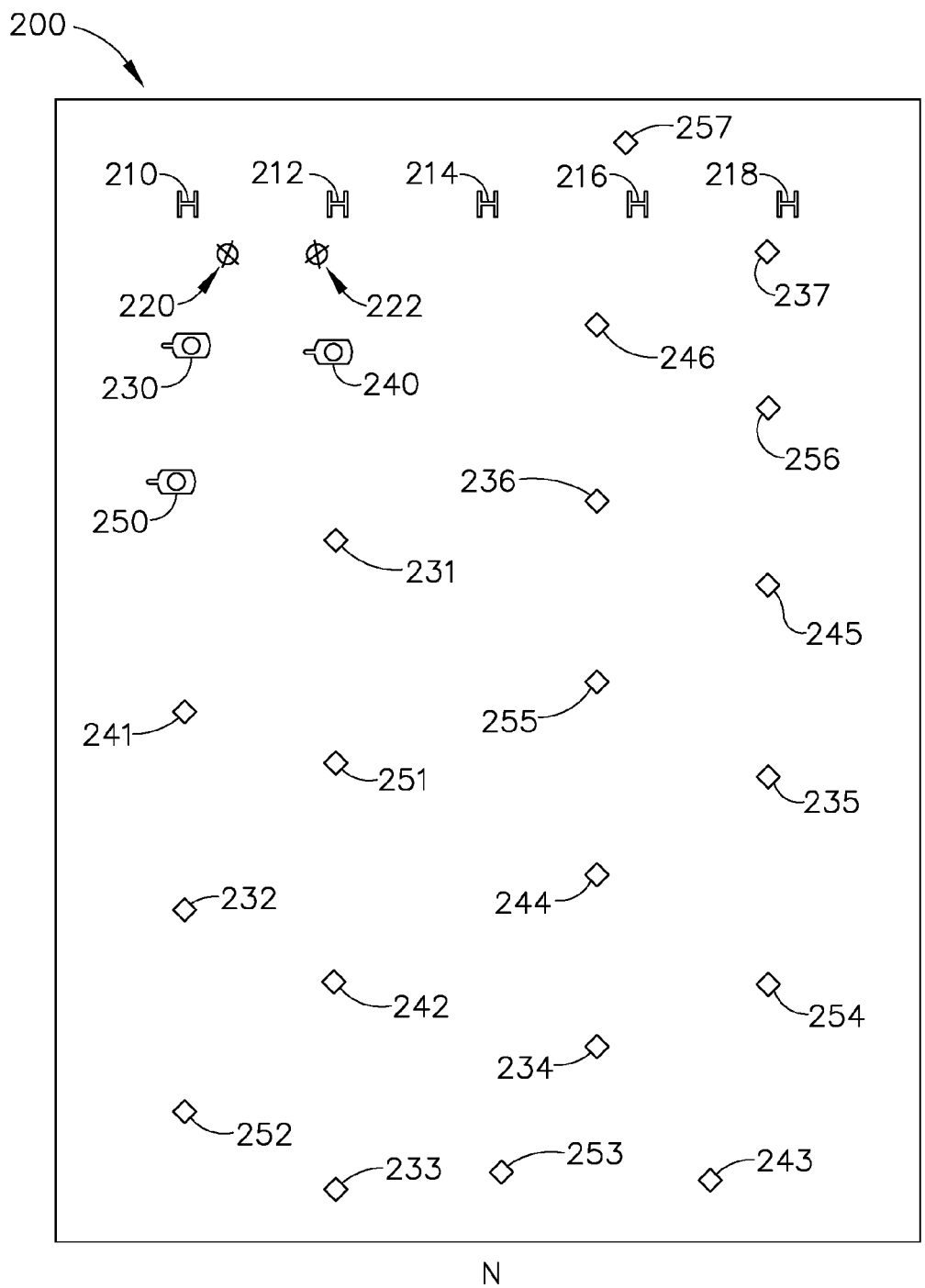
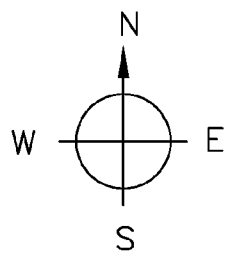
FIG. 20

POINT LAYOUT SYSTEM WITH THIRD TRANSMITTER

TECHNICAL FIELD

The technology disclosed herein relates generally to layout "surveying" equipment and is particularly directed to a two-dimension layout system of the type which identifies points and their coordinates, and transfers identified points on a surface to other surfaces in a vertical direction. Embodiments are specifically disclosed using at least three base units having laser light transmitters and certain laser light sensors, and with a remote unit to control certain functions. The multiple base units and their laser transmitters may be identical. Preferably the laser transmitters include a self-leveling capability, with a rotation axis about the azimuth, and emit a substantially vertical (plumb) laser plane output (as a fan beam or a rotating laser line).

When the system is set up it is capable of aiming (by rotation about their vertical axis) each of the vertical laser (light) plane outputs from the transmitters (which are positioned at some distance apart), so that the projected lines (of the vertical laser light planes) will cross on the surface at any given desired point on the jobsite floor. In addition, the extent (divergence) of the projected vertical laser light planes are such that they also cross overhead on the ceiling, which crossing point occurs at a location that is truly plumb above the corresponding crossing point on the jobsite floor surface (within the tolerance of the equipment, which must be fairly precise to emit substantially vertical laser light planes).

If at least three base units are used on the same jobsite floor, then each base unit in addition to first two base units will enhance coverage of the jobsite floor. Each laser transmitter preferably would have a different modulation frequency. After the first two base units are set up, they will be able to cover a first area of the jobsite floor, for laying out new points in that first area. However, an obstruction (perhaps a corner of an existing structure) might interfere with a portion of that first area. In that event, a third base unit could be sited at a physical location on the jobsite floor that allows that third base unit to cooperate with only one of the first two base units so as to "shoot around" that obstruction, thereby enhancing coverage of the point layout system by adding a second area of the jobsite floor to the overall area that is now covered by at least two of the base units for any given point in the first two areas.

Even if the jobsite floor is perfectly "clear," a third base unit could enhance the accuracy of the overall point layout system. For example, the overall system (having at least three base units) could decide which pair of laser transmitters would offer the least chance of error and the best angle for the laser receiver to pick up the laser planes. Once that decision was made (by the overall system, automatically), then the laser plane produced by the "weakest" base unit's laser transmitter could be commanded (automatically, if desired) to temporarily turn off, so that only the two "better" laser planes would then be visible to the user, thereby creating a stronger "X" marking on the jobsite floor at the point being laid out.

Furthermore, once three base units have been set up on the floor of a given jobsite, then any one of the three base units could be picked up and moved to a completely new position on that jobsite floor, and, so long as the "moved" third base unit has a line of sight to the other two base units, that third base unit can automatically be re-established (i.e., automatically set up with an alignment axis with each of the other two base units) on the virtual floor plan, without the user having to do anything but enter a command to re-align that third base unit with the other two base units that were not moved.

STATEMENT REGARDING FEDERALLY SPONSORED RESEARCH OR DEVELOPMENT

None.

BACKGROUND

Some of the early point layout systems used "active" laser light planes such as disclosed in U.S. Pat. No. 5,100,229, by Lundberg. This system could not produce a steady (or static) laser light plane that would be visible to workers on a construction jobsite.

Over the past few years, Trimble Navigation Limited of Sunnyvale, Calif. has designed and introduced into commerce a point layout system that, among other features, allows a user to visually locate points of interest on a two-dimensional horizontal surface, and which is especially useful in interior construction environments. This Trimble system is known as the "QML800/QML800G QuickMark Layout" product line, and has been on the market since about April, 2016. A simple, accurate and cost effective system for the layout of floor plans at the jobsite was long needed, and conventional GPS technology is not usable inside standard steel construction buildings. Previous laser based systems were overly complex and expensive, missing the mark in almost every area required for this market.

SUMMARY

Accordingly, it is an advantage to provide a floor layout system that includes at least three base units that can have an alignment axis established between each pair of base units, and a remote unit that communicates with all of the base units, in which the system is configured to provide a visual presentation of virtual points on a jobsite physical surface that have predetermined coordinates, relative to physical locations of at least two control points.

It is another advantage to provide a base unit that has a laser transmitter having an optical emission that creates a vertical laser light plane, a laser receiver with a null position-detecting capability, in which the receiver is mounted to detect laser light offsets in the horizontal direction, and a leveling mechanism.

It is yet another advantage to provide a remote unit that has a computer processing circuit and a memory circuit, along with a communication circuit that can communicate to the base units of a floor layout system, in which the remote unit also has a display and a user controlled input device; the remote unit also is in communication with a virtual building plan, and its display is capable of depicting at least two control points and at least one known virtual point that is to be visually indicated on a jobsite physical surface.

It is still another advantage to provide a method for setting up a floor layout system, in which the system includes at least three base units each having a laser transmitter, wherein a user will perform certain functions on a jobsite, including: (a) positioning the first two base units on a jobsite floor, (b) aligning the two laser transmitters of both of those base units to create an alignment axis, (c) locating two control points with intersecting laser light from the two laser transmitters, and (d) determining azimuth angles of the two laser transmitters for those control points; then: (e) placing a third base unit, also having a laser transmitter, (f) aligning the third base unit with the first two base units, using an automatic procedure that allows the third base unit to "find" the other two base units using 360-degree sensors and a rotatable vertical laser plane that is included in each base unit; and then: (g) using the "best" two of the three base units to layout points of interest on the jobsite floor.

It is yet another advantage to provide a method for setting up a floor layout system, in which the system includes at least three base units each having a laser transmitter, wherein a user will perform certain functions on a jobsite, including: (a) positioning the first two base units on a jobsite floor, (b) aligning the two laser transmitters of both of those base units to create an alignment axis, (c) locating two control points with intersecting laser light from the two laser transmitters, and (d) determining azimuth angles of the two laser transmitters for those control points, which completes a setup procedure for those two base unit with a virtual jobsite floor plan; then: (e) placing a third base unit, also having a laser transmitter, (f) aligning the third base unit with the first two base units, using an automatic procedure that allows the third base unit to "find" the other two base units, by use of a 360-degree sensor and a rotatable vertical laser plane that is included in each base unit, which establishes alignment axes between the third base unit and each of the first two base units, thereby completing a setup procedure for the third base unit with the virtual jobsite floor plan; and then: (g) moving one of the three base units to a different position on the jobsite floor, (h) initiating an automatic re-alignment function by which the base unit that was just moved establishes a new alignment axis with each of the other two base units that were not moved, which completes a setup procedure for the base unit just moved with the virtual jobsite floor plan; (i) laying out points of interest on the jobsite floor at a new area of that jobsite floor that was not in the line of sight of one of the two base units that was not moved, using the new position of the base unit that was just moved.

It is a further advantage to provide a method for using a floor layout system having "known" points of a building plan, in which the system includes at least three base units each having a laser transmitter, and including a remote unit that is communication with all the base units; wherein a user performs certain functions, including: (a) positioning the first two laser transmitters of the base units on a jobsite floor to establish an alignment axis therebetween, (b) providing a virtual jobsite floor plan, (c) determining coordinates of two control points of the virtual floor plan and determining azimuth angles of the two laser transmitters corresponding to those control points, which completes a setup procedure for those two base unit with a virtual jobsite floor plan; then: (e) placing a third base unit, also having a laser transmitter, (f) aligning the third base unit with the first two base units, using an automatic procedure that allows the third base unit to "find" the other two base units, by use of a 360-degree sensor and a rotatable vertical laser plane that is included in each base unit, which establishes alignment axes between the third base unit and each of the first two base units, thereby completing a setup procedure for the third base unit with the virtual jobsite floor plan; and then: (g) moving one of the three base units to a different position on the jobsite floor, (h) initiating an automatic re-alignment function by which the base unit that was just moved establishes a new alignment axis with each of the other two base units that were not moved, which completes a setup procedure for the base unit just moved with the virtual jobsite floor plan; (i) entering coordinates for a point of interest on the virtual floor plan, and slewing at least two of the laser transmitters to those coordinates (perhaps the using the "best" two of the three base units), and (j) visually indicating the physical point of interest on the jobsite floor, by use the laser light lines produced by the laser transmitters.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a layout and point transfer system is provided, which comprises: (a) a first base unit, having a first laser light transmitter that emits a substantially vertical first laser light plane, a first omni-directional photosensor, a first fine-positioning photosensor, a first processing circuit, a first memory circuit; (b) a second base unit, having a second laser light transmitter that emits a substantially vertical second laser light plane, a second omni-directional photosensor, a second fine-positioning photosensor, a second processing circuit, a second memory circuit; and (c) a third base unit, having a third laser light transmitter that emits a substantially vertical third laser light plane, a third omni-directional photosensor, a third fine-positioning photosensor, a third processing circuit, a third memory circuit; wherein: (d) after the first and second base units are placed on a physical jobsite surface, the system is configured: (i) to establish a first alignment axis between the first and second base units, and (ii) to determine first and second locations of the first and second base units on the physical jobsite surface with respect to at least two control points that are also located on the physical jobsite surface; and (e) after the third base unit is placed on the physical jobsite surface, the system is configured: (i) to establish a second alignment axis between the first and third base units, (ii) to establish a third alignment axis between the second and third base units, and (iii) to determine a third location of the third base unit on the physical jobsite surface with respect to the first and second base units, based on the second and third alignment axes.

In accordance with another aspect, a method for using a layout and point transfer system is provided, in which the method comprises the following steps: (a) providing a first base unit, having a first laser light transmitter that emits a substantially vertical first laser light plane, a first omni-directional photosensor, a first fine-positioning photosensor, a first processing circuit, a first memory circuit; (b) providing a second base unit, having a second laser light transmitter that emits a substantially vertical second laser light plane, a second omni-directional photosensor, a second fine-positioning photosensor, a second processing circuit, a second memory circuit; (c) providing a third base unit, having a third laser light transmitter that emits a substantially vertical third laser light plane, a third omni-directional photosensor, a third fine-positioning photosensor, a third processing circuit, a third memory circuit; (d) after the first and second base units are placed on a physical jobsite surface: (i) establishing a first alignment axis between the first and second base units, and (ii) determining first and second locations of the first and second base units on the physical jobsite surface with respect to at least two control points that are also located on the physical jobsite surface; and (e) after the third base unit is placed on the physical jobsite surface: (i) establishing a second alignment axis between the first and third base units, (ii) establishing a third alignment axis between the second and third base units, and (iii) determining a third location of the third base unit on the physical jobsite surface with respect to the first and second base units, based on the second and third alignment axes.

In accordance with yet another aspect, a method for using a layout and point transfer system is provided, in which the method comprises the following steps: (a) providing a first base unit, having a first laser light transmitter that emits a substantially vertical first laser light plane, a first omni-directional photosensor, a first fine-positioning photosensor, a first processing circuit, a first memory circuit; (b) providing a second base unit, having a second laser light transmitter that emits a substantially vertical second laser light plane, a second omni-directional photosensor, a second fine-positioning photosensor, a second processing circuit, a second memory circuit; (c) providing a third base unit, having a third laser light transmitter that emits a substantially vertical third laser light plane, a third omni-directional photosensor, a third fine-positioning photosensor, a third processing circuit, a third memory circuit; (d) after the first and second base units are placed on a physical jobsite surface: (i) establishing a first alignment axis between the first and second base units, and (ii) determining first and second locations of the first and second base units on the physical jobsite surface with respect to at least two control points that are also located on the physical jobsite surface; and (e) after the third base unit is placed on the physical jobsite surface: (i) aiming the third laser light transmitter at a spin axis of the first base unit, and establishing a second alignment axis between the first and third base units; (ii) aiming the third laser light transmitter at a selected one of the at least two control points; and (iii) determining a third location of the third base unit on the physical jobsite surface with respect to the first base unit based on the second alignment axis, and with respect to the selected one of the at least two control points.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIGS. 1-4 are diagrammatic views of how a human user would use the system of FIG. 21, first to align a pair of transmitter axes, then to align the transmitters to two different control points, and finally to align the laser planes to a floor point.

FIG. 19 is a diagrammatic view of a jobsite floor showing multiple I-beam uprights, two control points, and three base units of the type used in the system of FIG. 21, in which all three of the base units become set up to the virtual jobsite floor plan in the northwest corner of the physical jobsite floor.

FIG. 20 is a diagrammatic view of the jobsite floor of FIG. 19, in which the three base units are moved, one at a time, over the entire floor area, while automatically maintaining their set-up with the virtual jobsite floor plan.

DETAILED DESCRIPTION

Figure 5:
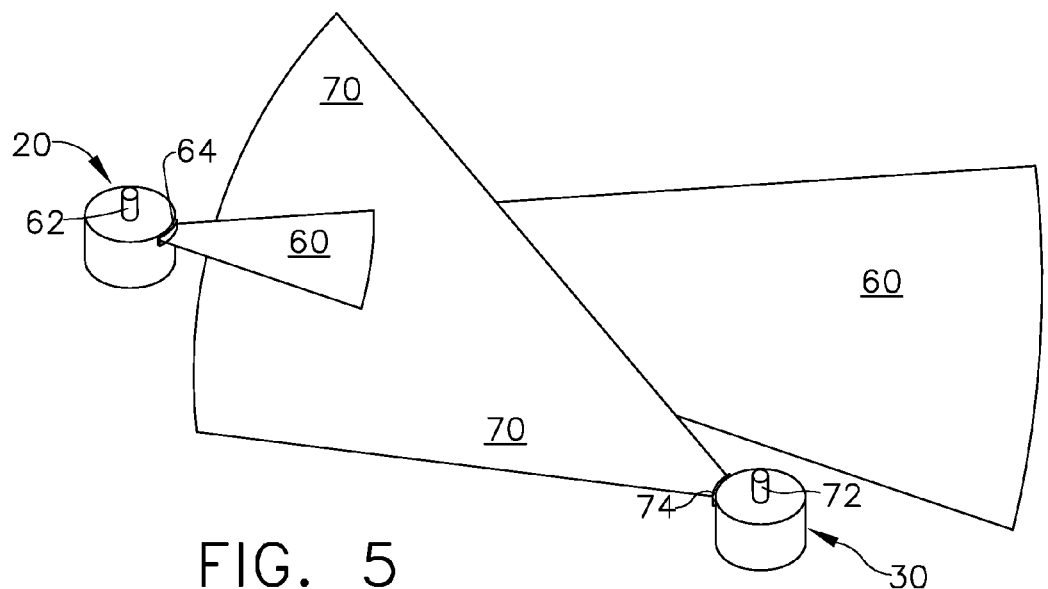
FIGS. 5-10 are diagrammatic views showing how two base units of the system of FIG. 21 can automatically establish an alignment axis therebetween.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

System Set-Up; Introduction

On jobsite floors, particularly for new construction, there's often a need to lay out new points of interest for constructing structures such as walls, pipe runs, wiring runs with conduits, and so on. The points of interest must first be located on the jobsite floor plan, unless they already happen to be at known physical locations that are often referred to as "control points," or "benchmarks." Surveying techniques are often used to find these new points of interest.

In the present system, to begin the procedure, a pair of control points (or "benchmarks") need to be located by a human user, and then a pair of "base units" will be positioned on the jobsite floor near those first two control points. Using the base units available from Trimble, the point layout system is quite easy to use. The Trimble base units each include a laser transmitter that produces a vertical laser plane of light; the hardware for the base units is described in greater detail below, in reference to FIG. 21. The laser fan beam of such base units has many important uses, which will be described below with reference to the figures.

This set of illustrations is provided to more readily demonstrate the ease of use of the Trimble point layout system. In FIG. 1, a first step for aligning the axes of the two laser transmitters is depicted. The laser transmitters are part of two base units 20 and 30, which are mounted on tripods in FIG. 1. A human user, generally designated by the reference numeral 45, is depicted as holding a hand-held remote unit 40, within the confines of an enclosed space (or room) 5. The room 5 has a ceiling surface 10 and a floor surface 12.

The laser transmitter at base unit 20 emits a substantially vertical laser fan beam, which has an upper angular limit line at 22 and a lower angular limit line at 24. The other laser transmitter at base unit 30 also emits a substantially vertical fan beam of laser light, and has an upper angular limit line at 32 and a lower angular limit line at 34. It should be noted that these two substantially vertical fan beams of laser light produce laser light planes that are "static" in nature. In other words, they are not constantly moving "active" laser light planes, as used by some conventional systems known in the prior art, which need strictly controlled timing to work at all, and which cannot produce steady (or static) "visible" laser light planes.

The object in this procedure, starting with FIG. 1, is to align an axis 48 between the two laser transmitters. The methodology for a detailed alignment procedure is described below, in reference to FIGS. 5-10. At this point in the description, it will be assumed that the alignment axis 48 is being determined by this procedure.

FIG. 2 illustrates the next step, which aligns the two laser transmitters to a first control point (referred to on FIG. 2 as "CP1" for Control Point 1). Please note that, surveyors typically refer to known points on a jobsite floor space as "benchmarks," whereas workers who actually perform the point layout activities typically refer to such points as "control points." In this description, the terminology used will tend to refer to these known points as control points, but it will be understood that a benchmark and a control point are virtually the same thing, and the use of either term will have essentially the same meaning.

Furthermore, there are procedures known as "benching" and "setting up" the equipment on a jobsite. It will be understood that both of these terms have similar meanings, although "setting up" a system component (such as a base unit) does not always require using a benchmark or a control point—however, there will be times in which the term "benching" is used to have a meaning of "setting up," and perhaps vice versa. Both terms generally are often used to describe a situation in which a piece of equipment becomes aware of its coordinates on a jobsite floor plan; that awareness could initially involve the coordinates of a virtual floor plan (on architect drawings, for example), but more specifically, the piece of equipment being "benched" or "set up" is literally placed on a physical jobsite floor and its position becomes known with respect to other physical known points (such as benchmarks or control points). In reality, "benching" is probably a more narrow term than "setting up" for a piece of equipment, but both terms can be essentially interchangeable is this technical field, without losing any real significance.

Finally, for many of the situations that involve laying out points on a jobsite floor, using benchmarks or control points in the context of the technology disclosed herein is typically referring to two-dimensional horizontal marks (2-D coordinates) on the floor, although three-dimension space (3-D coordinates) easily can be used with this technology. But note: in this technical field, the use of the term "benchmark" is certainly not restricted to marking a point as an elevational reference.

In FIG. 2, the interior space (or room) is referred to as reference numeral 6. The two laser transmitters are each rotatable about a vertical axis, and have been aimed at the point of interest that is Control Point 1, and is designated by the reference numeral 52. The two base units 20 and 30 have either had their lasers manually aimed by the user, or automatically adjusted by the user using the remote unit 40, if azimuth positioning motors and encoders are available on base units 20 and 30. After the two laser planes have been aimed so that they will intersect the first control point at 52, the laser planes will have an appearance as illustrated on FIG. 2. The laser plane from the fan beam laser transmitter of base unit 20 will again have angular limit lines 22 and 24, but will also produce a visible line along the ceiling at 26, and a similar visible line along the floor surface at 28. In a similar manner, the laser transmitter producing the fan beam from base unit 30 will emit angular limit lines 32 and 34, and also produces an upper visible line along the ceiling at 36 and a lower visible line along the floor surface at 38.

It will be understood that, as used herein, the terms "visible light" or "visible laser light" refer to laser light beams that are either directly visible by the human eye (i.e., having a wavelength in the range of approximately 430 nm to 690 nm), or refer to laser beams that are somewhat outside of the above "normal" range of visible acuity for human eyes, and the user is being aided by some type of special lenses. For example, the laser transmitters described herein could produce infrared (IR) laser light beams if desired, and the user could be wearing night-vision goggles; in that situation, the laser light beams would appear to be "visible" to that user, which is more or less necessary to properly use the alignment and location features of the system described herein.

The two lower laser plane edges 28 and 38 will intersect exactly at the control point 52, after the two laser transmitters have been correctly adjusted for their angular position along the azimuth direction, and the user will be able to visibly see that intersection point. Moreover, the two laser planes will intersect along a vertical line 50, which will be a plumb line if the two base units have been correctly leveled. This laser line of intersection 50 will actually be visible if a solid object, or some type of airborne smoky substance, is positioned along the line itself. At the top of the laser light line 50 will be another visible intersection of "horizontal" lines along the ceiling, which will be described below, in greater detail.

The third step is to align the laser transmitters for the two base units to the second control point, which is referred to on FIG. 3 as "CP2" (for Control Point 2). The interior space (or room) is designated at the reference numeral 7 in FIG. 3. The user now is required to move the angular positions (in the azimuth) of both laser transmitters for the base units 20 and 30 so that they are both aimed at the second control point, which is designated at reference numeral 82. Both laser transmitters continue to emit a plane of laser light, and the fan beam thereby produced has divergence angles that are represented by the lines 22, 24, 32, and 34. Furthermore, there will be upper and lower visible lines along the ceiling surface and floor surface, which again are designated by the line segments 26, 28, 36, and 38.

After the two laser transmitters have been properly aimed at the second control point 82, the lower visible lines of the two laser planes will intersect exactly at control point 82, and the user will be able to visibly see that intersection point.

It will be understood that, as used herein, the phrase "intersect exactly" at a specific point on a surface means that the user has adjusted the laser transmitters so that their emanating laser fan beams produce light lines that appear to be precisely crossing that specific point. Of course, there will likely be some small tolerance of error, and it is up to the user to make the proper adjustments in aiming the base unit laser transmitters so that the light lines are as close to "exactly" crossing right at the proper location. Since the laser light lines have a discernible width, the user cannot literally align the laser beams within some imperceptible tiny distance, and thus, there will likely be a very small tolerance of error in such "exact" positions of the laser transmitter azimuth angles. However, this is a very small error indeed, and moreover, the user will quickly become very good at making these azimuth position changes of the laser transmitters such that any such errors will essentially be negligible.

As in the case of FIG. 2, there will also be an intersecting vertical line between the two laser planes, and this intersecting line is represented at the reference numeral 80 on FIG. 3. This intersecting line 80 is a plumb line, so long as the two laser transmitters have been properly leveled.

After both control points have had their coordinates entered into the remote unit 40 (as per FIG. 2 and FIG. 3), the set-up of the system has been completed. Now the user will be able to enter other coordinates of interest into the remote unit 40, and cause the laser transmitters to automatically aim at those coordinates (assuming the laser transmitters are motorized and have angular encoders). FIG. 4 illustrates such a situation, in which the user has entered the coordinates of a floor point designated by the reference numeral 92 on FIG. 4. The enclosed space (or room) is designated at the reference numeral 8 on FIG. 4. The laser transmitters have been aimed so that their fan beams each produce a plane of laser light that is vertical, and both of these planes of laser light intersect exactly at the point 92 along the floor surface 12. There will also exist a vertical line of intersection between the two laser planes at the reference numeral 90. This will be a plumb line, as described before, so long as the laser base units 20 and 30 have been correctly leveled. More importantly, the two laser transmitters need to output laser planes that are substantially vertical with respect to gravity; if that correctly takes place, then the implied line 90 will also be substantially vertical with respect to gravity.

Since the plumb line 90 exists as a vertical line directly above the floor point 92, there will also be visible to the user a ceiling transfer point that is designated by the reference numeral 94. The user will see a pair of intersecting lines at point 94, which are produced by the two upper edges of the laser planes from the laser transmitters of base units 20 and 30. These are the upper edge lines of the fan laser beams along the line segments 26 and 36, which follow along the surface of the ceiling 10. This provides the user with a virtually instantaneous transfer point along the ceiling surface, every time the user first designates a floor point of interest. The ceiling transfer point 94 is automatically plumb above the floor point 92, since the implied line 90 is truly plumb. This system allows the building designer to lay out devices that are to be installed in the ceiling by using the coordinates on a two-dimensional floor plan, if desired.

The technology disclosed herein automatically can take floor points and transfer those coordinates to the ceiling; furthermore if the building plan was a three-dimensional plan, then a ceiling set of coordinates could first be entered instead of a floor set of coordinates. In that mode of operation, the two laser transmitters of base units 20 and 30 will still be able to slew automatically so that their laser fan beams will intersect the ceiling set of coordinates instead of the floor set of coordinates. The final appearance will be the same, just like what is illustrated in FIG. 4. The only difference will be that the ceiling point was determined first, instead of the floor point. There will still exist a plumb line 90 after the ceiling point has been laid out.

The ability of this system to create a vertical plumb line of laser light can be used advantageously. If the two laser transmitters of base units 20 and 30 have been aimed at a floor point that is located just along the edge of one of the walls, then the laser fan beams will create a visible plumb line of laser light that will literally be visible along the surface of that wall. For the implied laser plumb line to be visible along the wall surface, the wall must be positioned at or fairly close to the intersecting point on the floor. Of course, the wall itself must be fairly plumb, or the plumb line will not properly appear along the wall's surface.

If a two-dimensional floor plan is available, then the user can start with the floor intersecting point as the point of interest. On the other hand, if a three-dimensional set of floor plans is available, and if the ceiling intersecting point has coordinates that are available to the user, then that point could be used to cause both of the laser transmitters to be aimed at a wall surface, and a visible plumb line would appear as the (vertical) intersecting line of laser light. After the visible plumb line appears along the wall surface, the user can use that plumb line to help align and set studded wall. In addition, once the walls have been installed, the vertical plumb line can be used to help locate the positions for installation of wall outlets or HVAC ducts or vents, and other similar devices that are placed in walls of buildings.

Referring now to FIGS. 5-10, an example of a methodology for establishing an alignment axis between two base units is provided. Referring now to FIG. 5, the two base units 20 and 30 are emitting vertical planes of laser light in a fan beam shape, in which the plane of laser light for base unit 20 is designated by the reference numeral 60, and the plane of laser light from base unit 30 is designated by the reference numeral 70. As can be seen in FIG. 5, laser light planes 60 and 70 intersect one another, but they are not aligned, nor do they intersect the opposite base unit.

In FIG. 5, base unit 20 has a positioning photosensor at 64, which typically can be a "butt cell" set of photocells that are precisely aligned to the center of the emitted laser fan beam. Base unit 20 has a second photosensor at 62 that comprises a photocell and a cylinder lens. The cylinder lens extends vertically above the top of the base unit structure, and the photocell is attached at one end of the cylinder lens. This photocell and cylinder lens combination 62 is roughly aligned to the rotation center of base unit 20. (It does not need to be precisely aligned. Photosensor 62 provides "gross" alignment sensing capability for detecting the laser beams of the other laser transmitter, from base unit 30.)

In a similar fashion, base unit 30 also includes a positioning photosensor 74 which typically can be a "butt cell" array of photocells, which are precisely aligned to the center of the emitted laser fan beam 70. (Note: this "precise" alignment could include characterizing the array of photocells to correct for any offset, in case the position of the laser beam output and the photosensor's null point are not perfectly aligned.) Also, base unit 30 includes a cylinder lens and photocell combination at 72, which is roughly (not precisely) aligned to the rotation center of that base unit. Photosensor 72 provides "gross" alignment sensing capability for detecting the laser beams of the other laser transmitter, from base unit 20.

Figure 6:
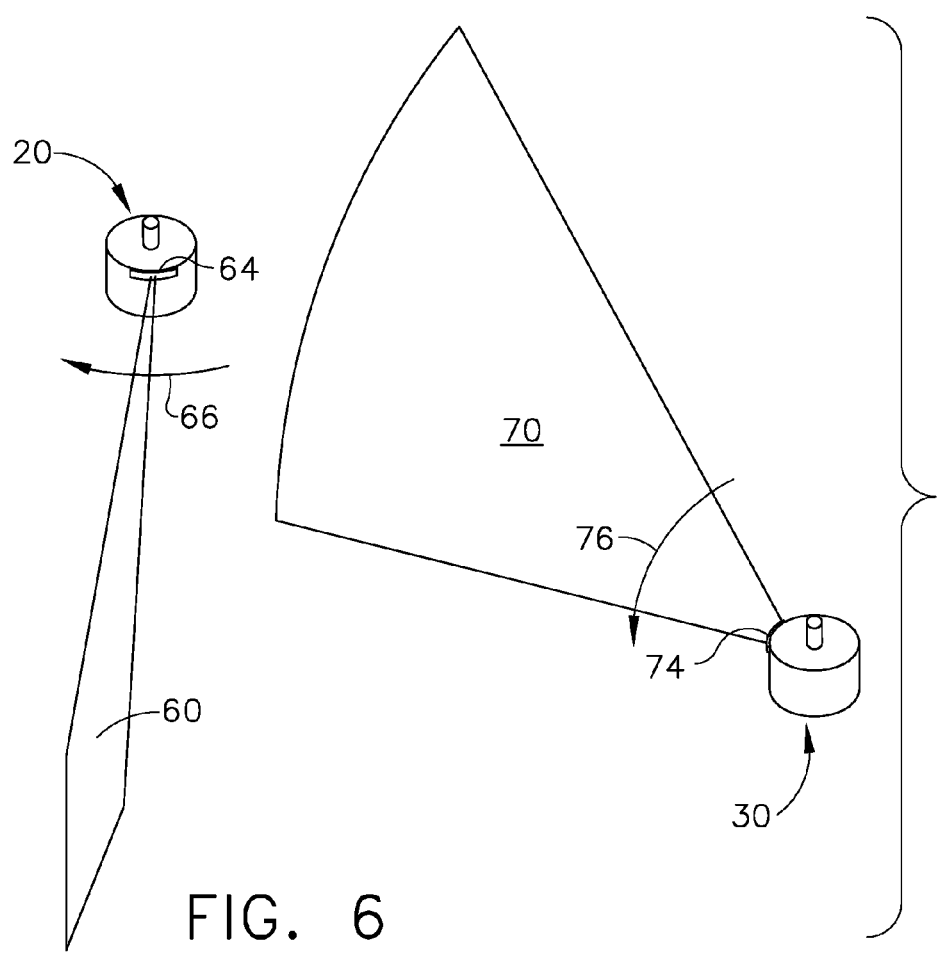

Referring now to FIG. 6, the user has entered a command so that each base unit will begin to rotate. The purpose of this rotation is to have the cylinder lens/photocell combination (either 62 or 72) detect the laser beam from the other base unit. In FIG. 6, it can be seen that both laser fan beams have changed position, but neither fan beam 60 or 70 are intersecting the other base unit. Laser fan beam 60 is rotating in the direction of an angular arc line 66, while base unit 30 has its laser transmitter beam 70 rotating in the direction of an angular line 76.

Figure 7:
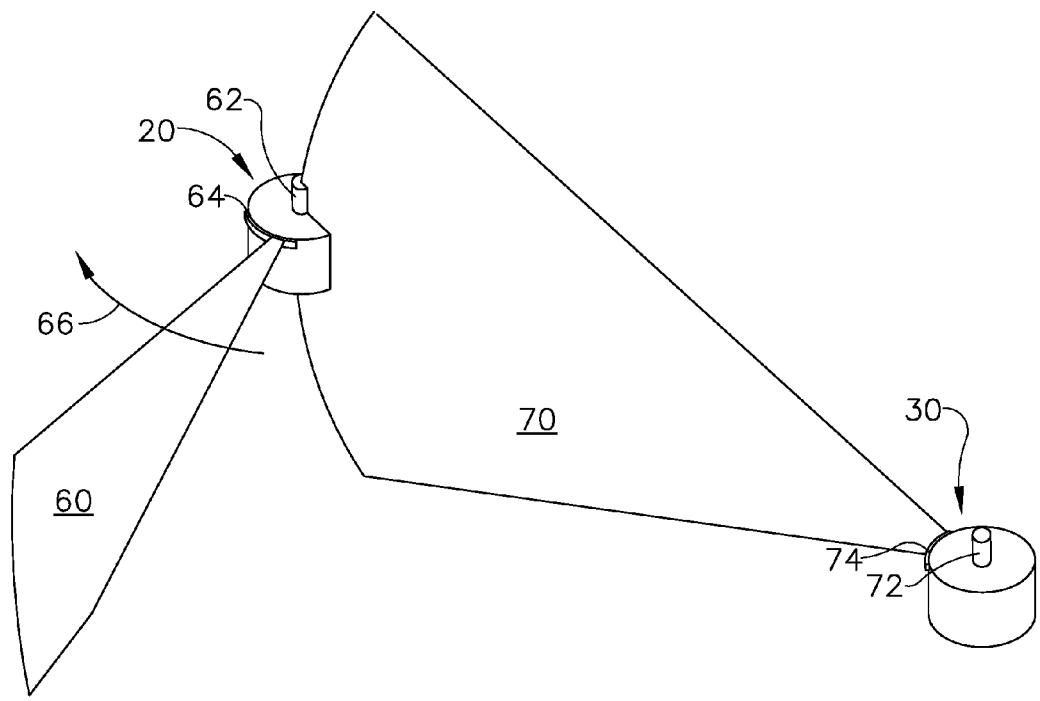
Figure 8:
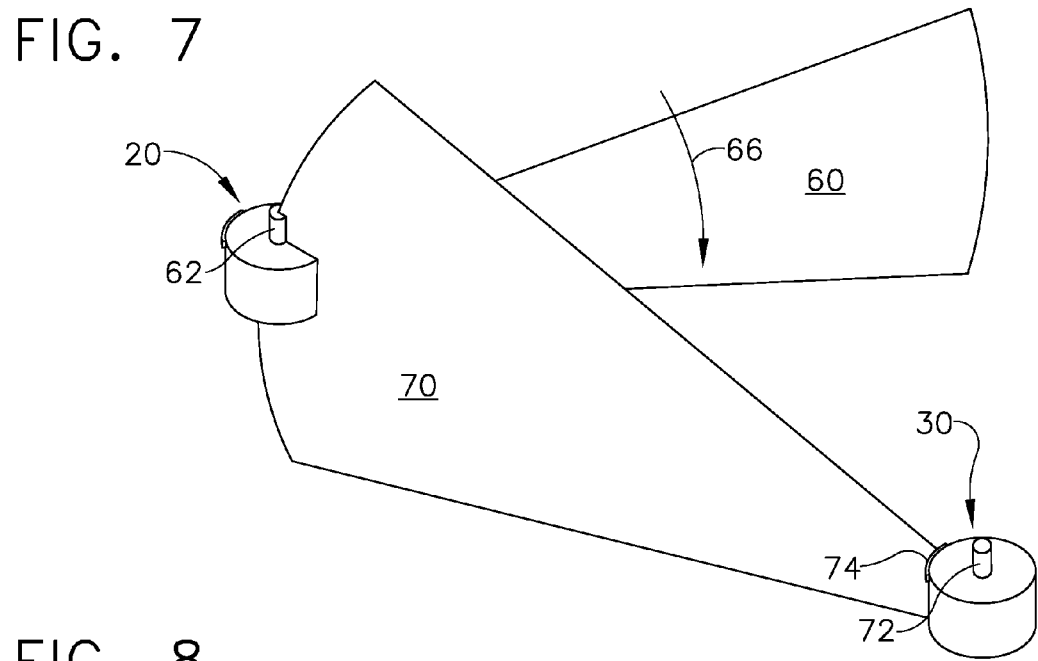

Referring now to FIG. 7, the laser fan beam 70 has intersected the vertical photosensor 62 of base unit 20. When this occurs, base unit 30 can stop rotating its fan beam 70, because it is now roughly in the correct position. However, the fan beam 60 from base unit 20 still needs to continue rotating in the direction 66. In FIG. 8, the fan beam 60 is still rotating from base unit 20, but has not yet intersected base unit 30. The fan beam 70 from base unit 30 has stopped, and is still intersecting the vertical photosensor 62.

Figure 9:
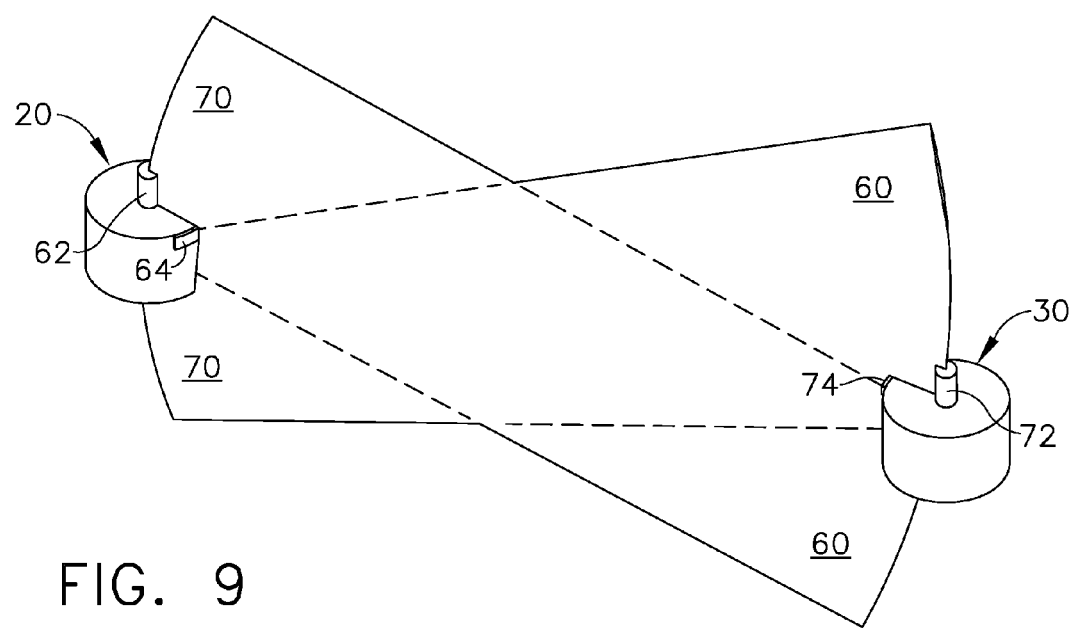

Referring now to FIG. 9, the laser fan beam 60 from base unit 20 has intersected the photosensor 72 of base unit 30, and the laser transmitter at base unit 20 now will stop rotating. At this time, both fan beams 60 and 70 are roughly aligned with the opposite base units 30 and 20 respectively.

Figure 10:
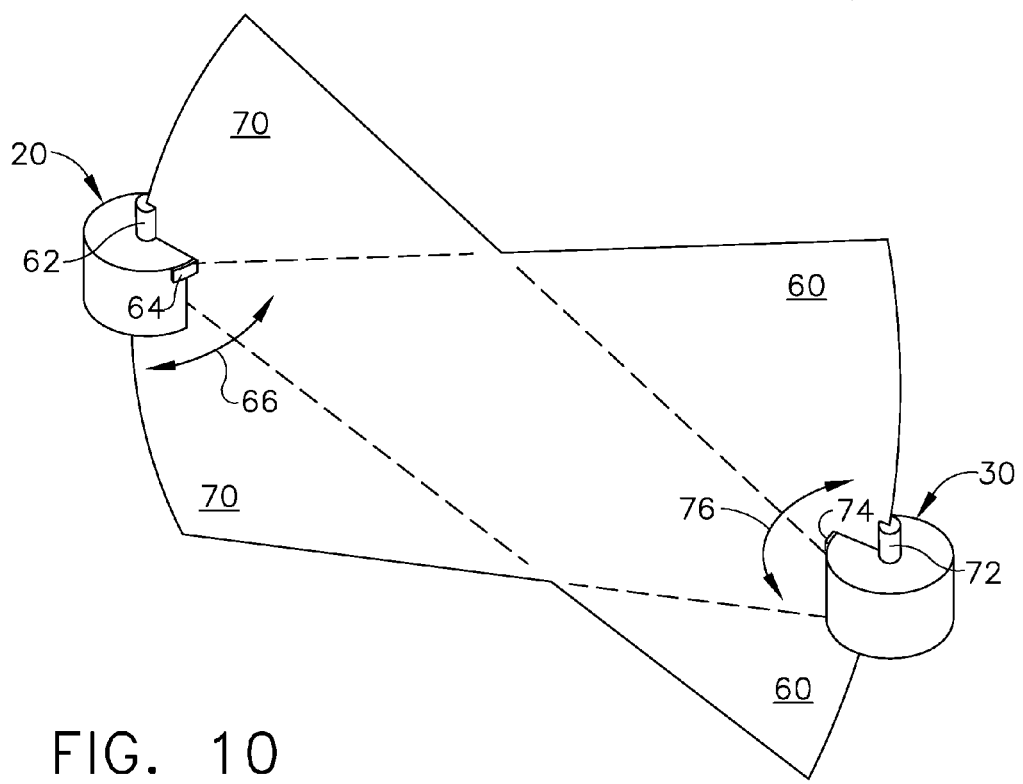

Referring now to FIG. 10, the positioning photocells 64 and 74 now come into play. Assuming these two photocells each comprise a pair of butt cell photosensors, they will have a deadband width between the two photosensitivity areas of the butt cell arrangement, and this deadband width is the desired position that will be sought by the two laser fan beams 60 and 70. Using the positioning photocells 64 and 74, the laser receivers on the two base units 20 and 30 will be able to determine the exact position of the laser strike of the fan beams 60 and 70 within a very small tolerance. The output signals from the laser receivers can be used to command the azimuth positioning motors of both laser transmitters for the base units 20 and 30 to move in small amounts until the vertical edge of the laser planes 60 and 70 are striking the butt cell deadband positions.

The butt cell deadband width can be made quite small, perhaps as small as 0.005 inches, if desired. In FIG. 10, the two laser transmitters are rotated iteratively until each of their fan beams are striking within the deadband width of the butt cells on the opposite base unit. This will now provide a very precise alignment axis between the two base units 20 and 30. In that regard, the photocells 64 and 74 perform as "fine-positioning photo sensors."

Automatically Establishing an Alignment Axis

The above examples show base units that are mounted on tripods. It should be noted that Trimble has introduced floor-mounted base units for its point layout system, and an example of how those units can operate is provided below. Referring now to FIGS. 11-15, an example of a methodology for establishing an alignment axis between two base units is provided, viewed from the perspective of a human user working within a room or space on a jobsite. On FIG. 11, there is a human user 45 holding a wireless remote unit, generally designated by the reference numeral 40. This wireless remote unit has a radio antenna 44, which could also be of some other type of communications hardware, if desired. The wireless remote also has a display 42, which preferably is a touch screen display so that the user can enter commands directly on the display. If a non-touch screen display is used, then some type of keypad entry device would be desired.

Figure 11:
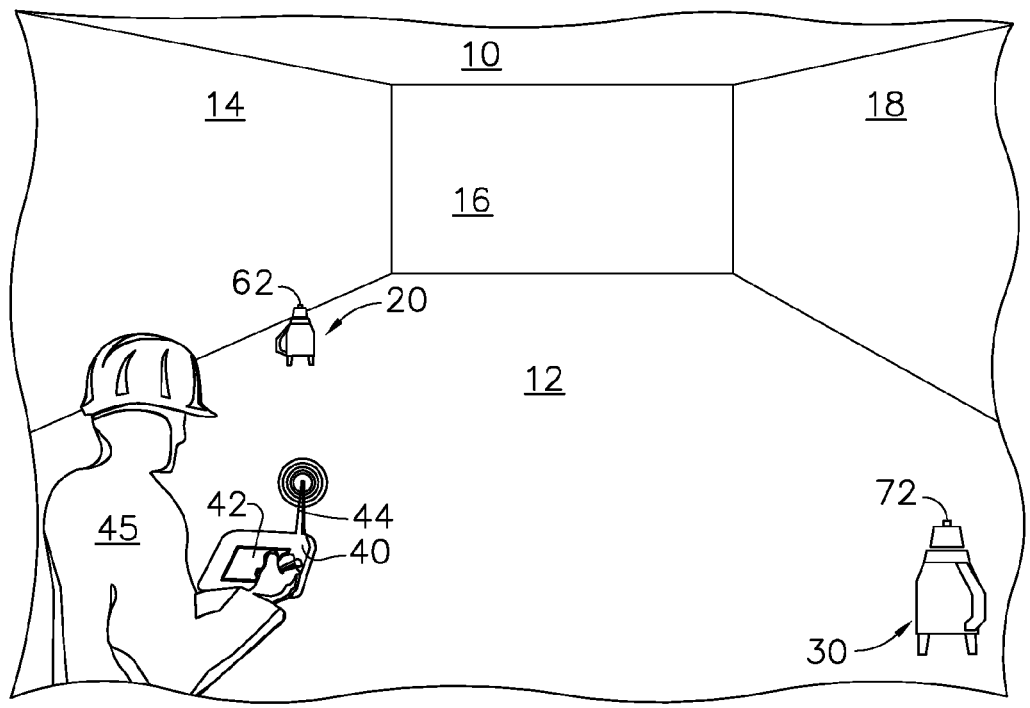
FIGS. 11-15 are diagrammatic views showing how two base units of the type described herein can automatically establish an alignment axis therebetween, from the perspective of a human user in an existing work space.

On FIG. 11, the user 45 is standing in a room or a space under construction, in which the ceiling of the room is designated at the reference numeral 10, the floor surface is at reference numeral 12, a left-side wall (typically vertical) is at reference numeral 14, a front wall is at reference numeral 16 and a right-side wall is at reference numeral 18. There are two base units 20 and 30 that are resting on the floor surface 12.

The user may place the base units 20 and 30 at any desired positions on the floor surface 12. In this example methodology starting on FIG. 11, no control points have been established as of yet, and there is no virtual floor plan resident on the remote unit 40. The base units will typically have the circuitry as described on FIG. 1, along with associated sensors, including a photosensor 62 for the first base unit 20, and a photosensor 72 for the second base unit 30. The next few figures will describe a methodology for establishing an axis between the two laser transmitters of base units 20 and 30, much like what was described above in reference to FIGS. 5-10.

Figure 12:
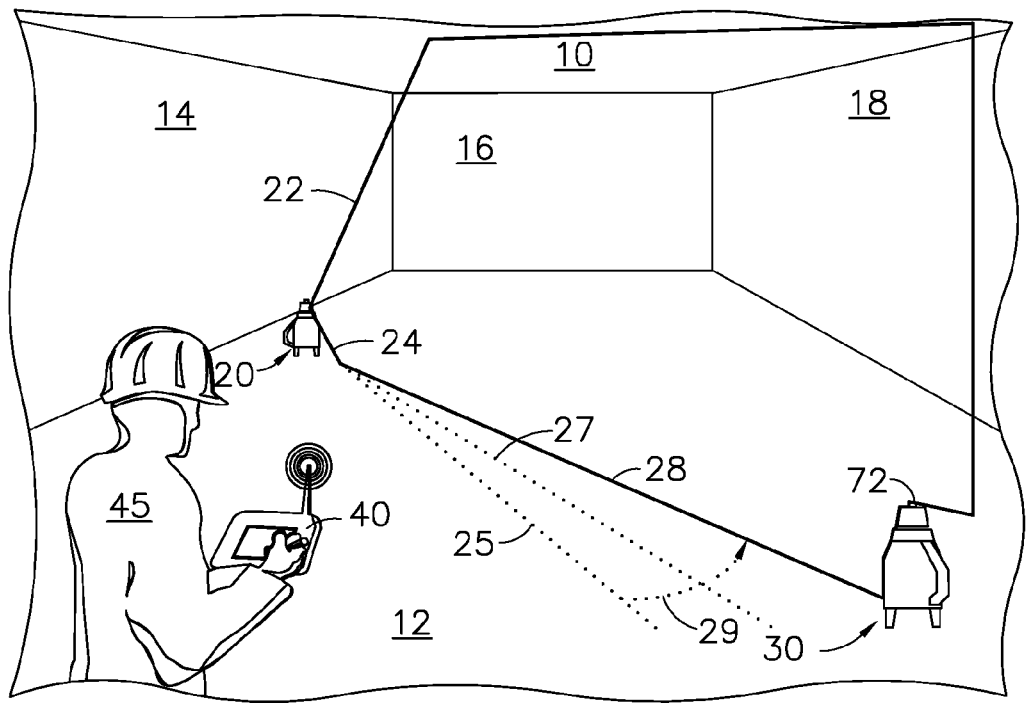
Figure 13:
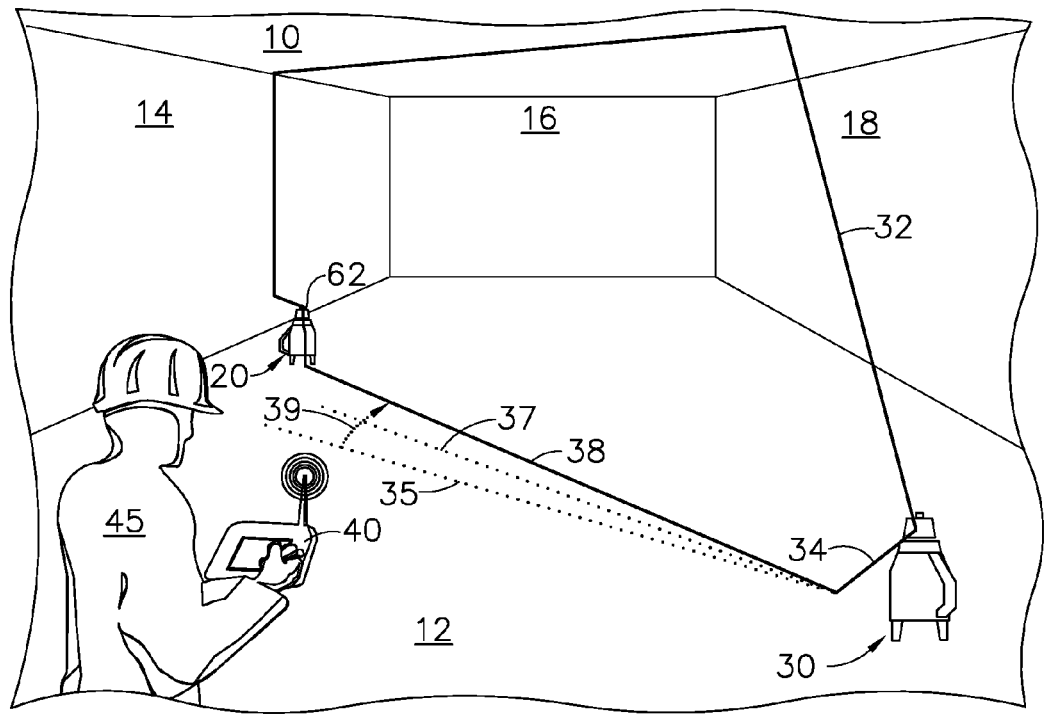

Referring now to FIG. 12, base unit 20 is emitting a vertical plane of laser light in a fan beam shape, in which the upper edge of the fan beam is designated at the line 22, and the lower edge of the fan beam is designated at the line 24. The lower edge of the fan beam is seen as a visible line that travels across the floor surface at 12, which is directed at various angular positions as the laser transmitter rotates on base unit 20. On FIG. 12, the first position of the laser light line on the floor surface is illustrated at 25, and then as the fan beam rotates in the direction of arrow 29, a later line of laser light appearing on the floor surface is illustrated at 27, and a yet later line of laser light is illustrated at the line 28. When the fan beam from base unit 20 impacts the photocell 72 of the base unit 30, a command is sent to the base unit 20 to stop its rotation of the laser fan beam, so it stops its movement while impacting the photosensor 72.

As noted above, base unit 20 has a positioning photosensor at 64, which typically can be a "butt cell" set of photocells that are precisely aligned to the center of the emitted laser fan beam. Base unit 20 has a second photosensor at 62 that comprises a photocell and a cylinder lens. The cylinder lens extends vertically above the top of the base unit structure, and the photocell is attached at one end of the cylinder lens. This photocell and cylinder lens combination 62 is roughly aligned to the rotation center of base unit 20. (It does not need to be precisely aligned. Photosensor 62 provides "gross" alignment sensing capability for detecting the laser beams of the other laser transmitter, from base unit 30.)

As discussed above, base unit 30 also includes a positioning photosensor 74 which typically can be a "butt cell" array of photocells, which are precisely aligned to the center of the emitted laser fan beam 70. Base unit 30 also includes a cylinder lens and photocell combination at 72, which is roughly (not precisely) aligned to the rotation center of that base unit. Photosensor 72 provides "gross" alignment sensing capability for detecting the laser beams of the other laser transmitter, from base unit 20.

As depicted on FIG. 12, the user enters a command so that base unit 20 will rotate its laser fan beam transmitter. The purpose of this rotation is to have the omni-directional photocell 72 detect the laser beam at the other base unit 30. The laser fan beam from base unit 20 is rotating in the direction of an angular arc line 29, as discussed above. Once the laser fan beam has intersected the vertical photosensor 72 of base unit 30, base unit 20 can stop rotating its fan beam, because it is now roughly in the correct position.

There also is a vertical plane of laser light in a fan beam shape being emitted by the other base unit 30, and it is desired for that fan beam to impact the photosensor 62 of base unit 20. This situation is depicted on FIG. 13. The top edge of the fan beam emitted by base unit 30 is located along the line 32, and the bottom edge of this laser fan beam is located along the line 34. The fan beam laser plane emitted by base unit 30 will create a line along the floor surface 10, starting at a position 35, and then as the line rotates in the direction of the arrow 39, the visible laser light line changes position to the line 37, and finally to the line 38, where it impacts the photosensor 62 of base unit 20.

Figure 14:
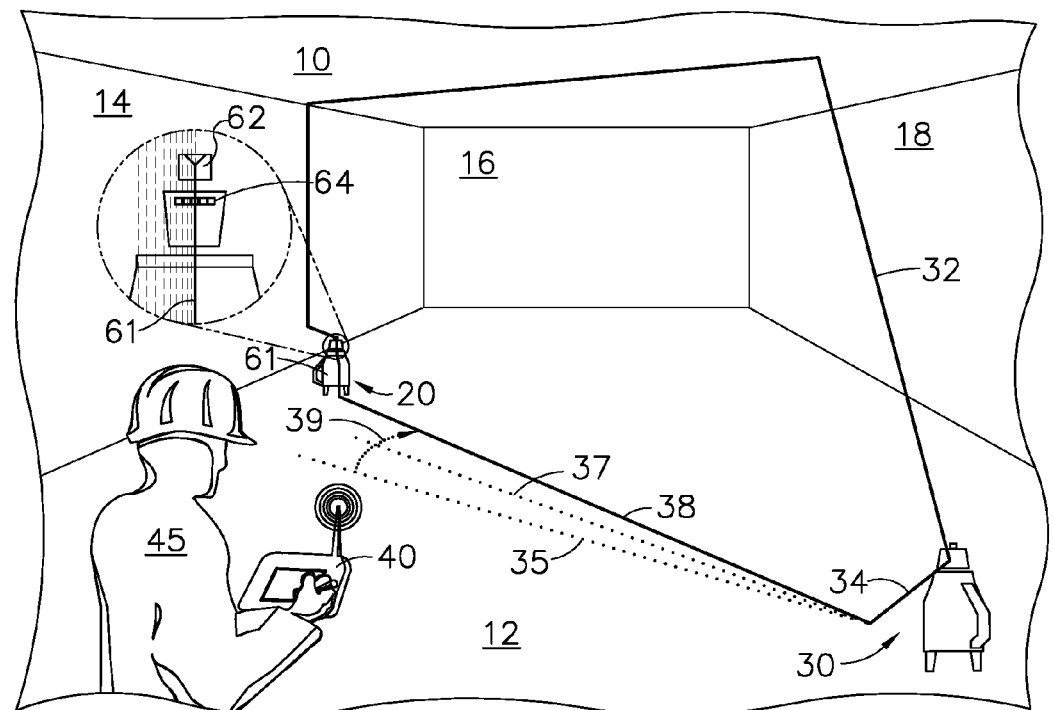

On FIG. 14, the laser fan beam 60 from base unit 20 has intersected the photosensor 72 of base unit 30, and the laser transmitter at base unit 20 now will be commanded to stop rotating. At this time, both fan beams (at lines 28 and 38) are roughly aligned with their opposite base units 30 and 20 respectively.

Referring now to FIG. 14, a set of null-position photocells 64 now come into play. Assuming these null-position photocells 64 comprise a pair of butt cell photosensors, they will have a deadband width between the two photosensitivity areas of the butt cell arrangement, and this deadband width is the desired position that will be sought by the two laser fan beams of base units 20 and 30. Using the null-position photocells 64 (there also is a set of such photocells 74 on the base unit 30, as per FIG. 5), the laser receivers 24 and 34 on the two base units 20 and 30 will be able to determine the exact position of the laser strike of the fan beams within a very small tolerance. The output signals from the laser receivers can be used to command the azimuth positioning motors of both laser transmitters for the base units 20 and 30 to move in small amounts until the vertical edge of the laser planes 60 and 70 are both striking the butt cell deadband positions.

The butt cell deadband width can be made quite small, perhaps as small as 0.005 inches, as noted above. In FIG. 14, the two laser transmitters are rotated iteratively (back and forth) until each of their fan beams are striking within the deadband width of the butt cells on the opposite base unit. This will now provide a very precise alignment axis between the two base units 20 and 30. In that regard, the photocells 64 and 74 for base unit 30 perform as "fine-positioning photosensors."

Figure 15:
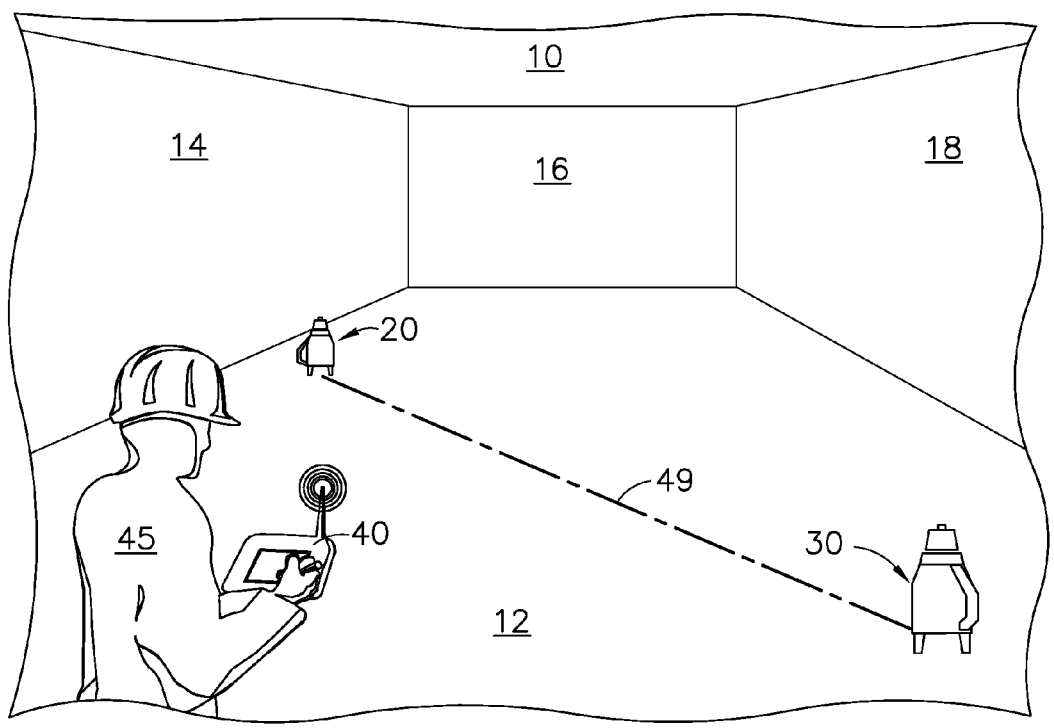

On FIG. 14, a vertical line 61 can be seen striking the base unit 20. In the inset view of FIG. 14, it can be seen that the increments of movement of the rotation of the laser fan beam emitted by base unit 30 can be made smaller and smaller, particularly after the fan beam begins striking the omni-directional photosensor 62. Once the fan beam impacts the photosensor 62, the fine-positioning photosensors (e.g., null-positional butt cell photosensors) can take over the positioning commands for the base unit 30, with regard to which direction it should rotate its laser transmitter. As stated above, these commands can be made in smaller and smaller positioning increments, and if the target is overshot, then the rotation direction can be reversed from that of the arrow 39, until the deadband of the butt cells has been targeted. Once that occurs, then both fan beams emitted by base units 20 and 30, should be in the same alignment plane, and an alignment axis 49 has become established, as depicted in FIG. 15.

In greater detail, the positioning commands that are sent to and from the base units 20 and 30 will probably be transmitted through the remote unit 40. However, it is also possible for the base units to talk directly to one another, if that option is selected by the designer of the equipment. Yet another option is to allow the user to manually point the laser transmitters at the opposite base unit, and if done with sufficient accuracy, that manual operation situation would eliminate the need for an omni-directional photosensor on top of the base units. Of course, this last option would eliminate many of the nice features of using automatic control of the base units, which otherwise is provided by the technology disclosed herein.

In a preferred mode of controlling the base units, a typical operation would be causing the base unit 20 to rotate its fan beam until the omni-directional photosensor 72 on base unit 30 eventually receives that fan beam. When this occurs, base unit 30 will send a message to the remote unit 40 that it is now sensing the fan beam from base unit 20. The remote unit 40 quickly sends a message to base unit 20, so that the base unit 20 will stop rotating its fan beam. At that point, the fine adjustment of the null sensing array (e.g., the butt cells) will be used to sense the exact relative position of the fan beam as it impacts base unit 30, and base unit 30 will send corresponding information through the remote 40 (to then be transmitted to base unit 20), instructing base unit 20 which direction it should rotate its laser fan beam. Eventually the fan beam emitted by base unit 20 will reach the null position on base unit 30, and when that occurs, a command will be sent (typically starting at base unit 30) to base unit 20 instructing it to stop moving its rotatable laser transmitter, and its fan beam will then be aimed directly at the deadband of the null-position sensor of base unit 30.

It should be noted that a very precise omni-directional axis sensor might be developed that could eliminate the need for the butt cell array. However, this would require a quite precise omni-directional sensor, in which the characteristic response curve would need to exhibit a relatively sharp change in signal versus the angle of incidence of the laser light beam as it impacts the sensor itself. Some signal processing might also be usable to improve the overall characteristics of such an omni-directional sensor for this purpose. It will be understood that a certain amount of fine alignment is needed for the axis to be established between the two base units 20 and 30. Otherwise, the results on the jobsite will be diminished.

System Set-Up Using Three Base Units

Figure 16:
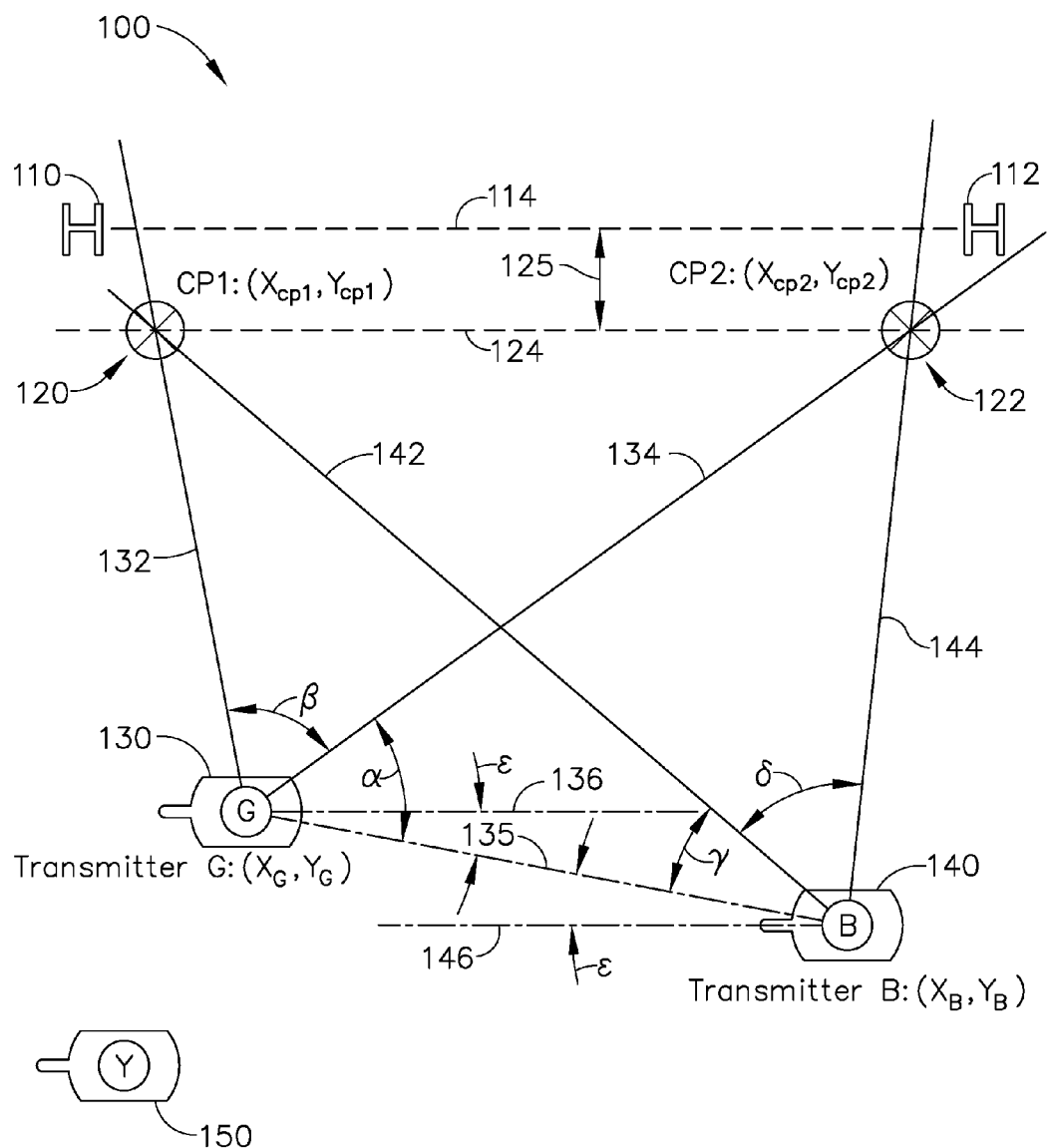
FIG. 16 is a diagrammatic view of a jobsite floor showing positions of I-beam uprights with a centerline, a parallel chalk line with control points, and three base units of the type used in the system of FIG. 21, in which two of the base units are involved in an initial setup routine.

Referring now to FIG. 16, a portion of a jobsite floor is depicted in an elevational view, which includes two vertical I-beams at 110 and 112, which are typically referred to as uprights. As is done with many jobsite floor layout situations, a chalk line is often snapped between the centers of these two I-beams 110 and 112, creating a snapped chalk line 114. Since it is difficult to work directly through a line that travels through uprights, the workers on the jobsite will typically offset a second chalk line by a certain distance, in which that offset chalk line is parallel to the original centerline between the I-beams. Thus a second chalk line 124 is snapped parallel to the initial chalk line 114. All of this is shown in this view of the jobsite floor that is generally depicted by the reference numeral 100.

Two control points CP1 and CP2 are selected along the offset chalk line 124. The locations of these control points are designated by the reference numerals 120 and 122 on FIG. 16. These control points may be known on this jobsite floor plan, or if they need to be created from the jobsite's drawings, that can be done by proper surveying techniques. In any event, control points 120 and 122 will become known points on the actual jobsite floor, and also on the virtual floor plan that is in the database of the architect computer 350 (see FIG. 21), in which that virtual floor plan will also be used for the remote unit 340 that will be available on the actual jobsite for use by the users working with the base units.

The offset distance is designated by the reference numeral 125 on FIG. 16, and that can either be predetermined if the control points 120 and 122 are themselves predetermined or, if desired, this offset distance can be selected by the jobsite workers. As noted above, the coordinates on the jobsite floor must become known for these two control points. A typical distance for the offset amount would be two feet (which would be the dimension noted at reference numeral 125).

It is now time to begin setting up the base units that include laser transmitters. In this example starting with FIG. 16, there will be three different base units 130, 140, and 150. It should be noted that each of these base units can be identical in all respects, although it can be advantageous to use a different color for the beacon signal (or beacon lamp) that will typically be available on each of the base units. For example, on FIG. 16, the base unit 130 has a green color lamp for its beacon, hence the letter "G" is used on the drawing. The base unit 140 has a blue color beacon lamp, hence the use of the "B" on the drawing of FIG. 16. Finally, the third base unit 150 can have a yellow color beacon lamp, as indicated by the letter "Y" on FIG. 16.

To start with, only two of the base units are placed on the jobsite floor, and in this example of FIG. 16, those will be the base units 130 and 140. As can be seen by viewing FIG. 16, the laser transmitters can "aim" at each of the control points 120 and 122, and the aiming lines from the laser transmitter of the first base unit 130 are designated by the reference numerals 132 and 134, aiming at the respective control points 120 and 122. Similarly, the aiming lines from the laser transmitter for the second base unit 140 are designated by the reference numerals 142 and 144, aiming at the control points 120 and 122, respectively. At this time, and knowing information which includes the azimuth directions for all these various aiming lines for each of the base units, these two base units now become set up with the control points, using an automatic axis alignment procedure, as discussed above in reference to FIGS. 1-3. The axis of alignment between the two base units is designated by the reference numeral 135 on FIG. 16. Now that the laser base units 130 and 140 are aligned with one another, the azimuth angles of the aiming lines can be measured, thereby giving the actual angles $\alpha$, $\beta$, $\delta$, and $\gamma$. This information now allows the coordinates of these two base units 130 and 140 to now be calculated with respect to the virtual jobsite floor plan.

Equations are provided below to show how a third base unit can have its coordinates automatically calculated once these first two base units 130 and 140 have been located on the virtual floor plan of this jobsite. Part of the coordinate information of the first two base units includes knowing a line that is parallel to the original chalk line that was offset from the I-beam uprights, and this is in reference to the line 124 on FIG. 16. There are two parallel lines that intersect the laser transmitter's spin (or pivot) axis of the laser fan beam of the first two base units. (Note that the laser pivot axis of a base unit is a substantially vertical axis, once the aiming platform has been substantially leveled. The pivot axis of the laser fan beam can also be referred to as the "spin axis" of the base unit.) These parallel lines are designated on the diagram of FIG. 16 at 136 and 146. One can see by inspecting FIG. 16 that these two lines are both parallel to the offset chalk line 124. The alignment axis 135 also intersects both laser spin axes of the two base units, and the angle formed between lines 135 and 136 is the angle $\epsilon$; there also is a similar angle $\epsilon$ between the lines 135 and 146.

These angles $\epsilon$ are not known in advance, but must be calculated from the angular azimuth information that is available from the two aiming lines between the laser transmitters and the two control points CP1 and CP2. For example, the aiming lines between laser transmitter (base unit) 130 and the two control points are the lines 132 and 134. Assuming a position encoder (acting as an "aiming angle sensor") is mounted to the first base unit 130, then this angular information can be automatically detected and fed into the computing system (i.e., the processing circuit) of that base unit. This is the angle β, and that information will ultimately lead to knowing the angle α, which in turn will lead to the calculation for the angle ε. To calculate this information, however, one also needs to know the angular information regarding the second base unit 140. The angle between the aiming lines 142 and 144 is the angle δ, and this is the critical information that is now needed to calculate the coordinates of the two base units. Once the coordinates of both control points 120 and 122 are known, as well as the angular encoder information for the aiming lines 132, 134, 142, and 144 are known, then the coordinates for the two base units 130 and 140 can be easily calculated by known geometric methods.

On FIG. 16, the jobsite floor plan coordinates of the first control point are designated $(X_{cp1}, Y_{cp1})$, the coordinates of the second control point are $(X_{cp2}, Y_{cp2})$. For base unit 130 the coordinates are $(X_G, Y_G)$, and for the base unit 140, the coordinates are $(X_B, Y_B)$.

As discussed above, using these laser transmitters of the two base units that are now set up within the virtual floor plan allows essentially any physical point of interest to be easily placed (or "laid out") within the coordinate system of the virtual floor plan. To accomplish this, the laser transmitters can be aimed at any particular point on the jobsite floor that is a point of interest, so long as that point can be visually seen by the human user (the worker) on the jobsite floor and can be marked or otherwise designated by that worker. That point of interest will then have its jobsite coordinates automatically calculated and therefore known, within the virtual jobsite floor plan. This capability will now come into play for positioning a third base unit 150.

Figure 17:
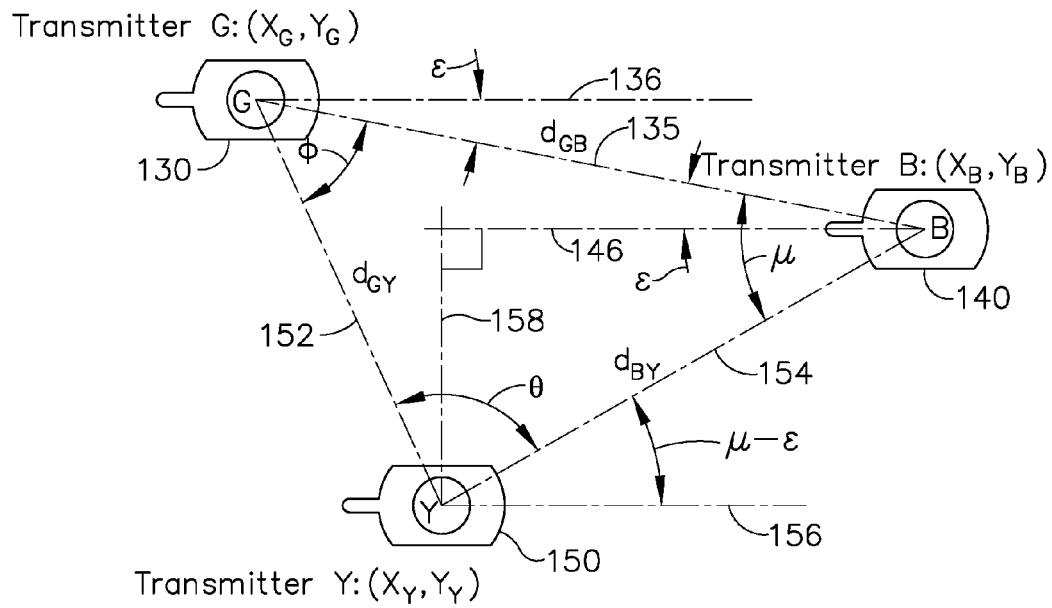
FIG. 17 is a diagrammatic view showing positions the three base units of the system of FIG. 16, in which the third base unit is involved in an automatic setup routine.

Referring now to FIG. 17, the third laser transmitter 150 is now being depicted as having a set of coordinates $(X_Y, Y_Y)$, which must be calculated so that this base unit 150 is set up within the virtual floor plan coordinate system. And since these particular base units can automatically be controlled and aimed at each other, it is a simple procedure to locate the third base unit 150 anywhere on the jobsite floor that can be visually seen by both of the first two base units 130 and 140, and then run an automatic software routine that allows the first two base units to sweep across the jobsite floor with their laser fan beams until they are both aimed directly at the spin axis of the third laser base unit 150. Once both laser fan beams of base units 130 and 140 are aimed directly at the spin axis of the base unit 150, then geometric equations can be used to calculate the coordinates of the third base unit 150. See below.

On FIG. 17, some of the same information that was visible on FIG. 16 is still used. For example, the two parallel lines that travel through the spin axes of the first two base units 130 and 140 are visible, designated at the reference numerals 136 and 146, respectively. The alignment axis reference numeral 135 can be seen, which runs between spin axes of these two laser base units 130 and 140. This alignment axis 135 has a distance that is referred to as $d_{GB}$. Once the aiming lines are established between the base units 130 and 150, and the base units 140 and 150, those will also become alignment axes, as follows: between base units 130 and 150, the alignment axis is designated by the reference numeral 152, and has a distance $d_{GY}$, and the alignment axis between base units 140 and 150 is designated by the reference numeral 154, and has a distance $d_{BY}$.

These distances for the alignment axes 152 and 154 must be calculated, of course, and the use of a right triangle is brought into play. The line 146 is used with an intersecting line 158 that forms a right angle with line 146 and passes through the spin axis of the third base unit 150. The final portion of that right triangle is the hypotenuse, which is line 154, and which is also the alignment axis between the base units 140 and 150. All of this angular information can be automatically detected by the azimuth encoders that are located on each of the base units 130, 140, and 150.

Ignoring the right triangle for a moment, the important angles between the three alignment axes are designated on FIG. 17 as θ, μ, and φ. The equations below will sub-divide the angle μ into two components, by subtracting the angle ε from it. The difference between these two angles is equal to the angle between the alignment axis 154 and yet another parallel line 156 that is parallel to the lines 136 and 146, and also intersects the spin axis of the third base unit 150. All of this information is used to determine the coordinates on the jobsite virtual floor plan of the third base unit 150. To find the numeric values of the coordinates $(X_Y, Y_Y)$, the following equations are used to perform that calculation:

Law of Sines: EQUATION #1

$$\frac{\sin(\theta)}{d_{GB}} = \frac{\sin(\phi)}{d_{BY}}$$

Therefore:

$$d_{BY} = d_{GB} \cdot \frac{\sin(\phi)}{\sin(\theta)}$$

Equations #2 and #3
Then:

$$X_Y = X_B - d_{BY} \cos(\mu - \epsilon)$$

$$Y_Y = Y_B - d_{BY} \sin(\mu - \epsilon)$$

Setup of the third base unit is accomplished automatically, and there is no need to manually position any laser lines over any control points once the first two laser transmitters have, themselves, been set up. The axis alignment between the third laser transmitter (base unit 150) is performed automatically by use of optical sensors that are positioned on top of each rotary axis of the rotatable laser fan beams of each of the base units. The procedure for doing this was described above, in reference to FIGS. 5-15.

Once there are three laser transmitter base units positioned on a particular jobsite floor that have been set up to the virtual floor plan for that jobsite, certain functions can be automatically used to make the tasks easier for the workers, specifically to set up and lay out new points of interest on the jobsite floor. For example, during use the control system could automatically decide which of the three laser transmitters will yield the strongest "position of interest" calculation. Once the system determines which two of the three laser transmitters are the proper ones to use, then the laser fan beams on only those two transmitters will turn on to reveal the point of interest. (That is, the laser transmitter of the third base unit would be automatically turned off for that particular point.)

There can be multiple criteria to determine which of the two base units are in position to provide the best or strongest position of interest calculation and, for example, a criterion for determining the two best lasers used may be as simple as ensuring that the two line intersections are closest to perpendicular by two of the three base units. Another possible criterion could be to use the two nearest base units to a particular point of interest—i.e., to have the strongest fan beam light signals at the crossing point of the two fan beams, which will both have brighter intensities, and somewhat narrower widths of the fan beam signal (at the closest distances).

As will be discussed in greater detail below, there are many advantages to using a third base unit and its laser transmitter. The first two were mentioned above, in which one can potentially eliminate all areas of poor strength of triangulation calculation fields, and a second advantage is to potentially eliminate the need to deal with shallow angle laser light intersections. Another advantage is to potentially eliminate all areas of blockage from jobsite obstructions. And finally, during the course of a day's work, any of the three base units can be moved to achieve improved coverage, and they can be re-set up automatically.

Examples of System Use with Three Base Units

Figure 18:
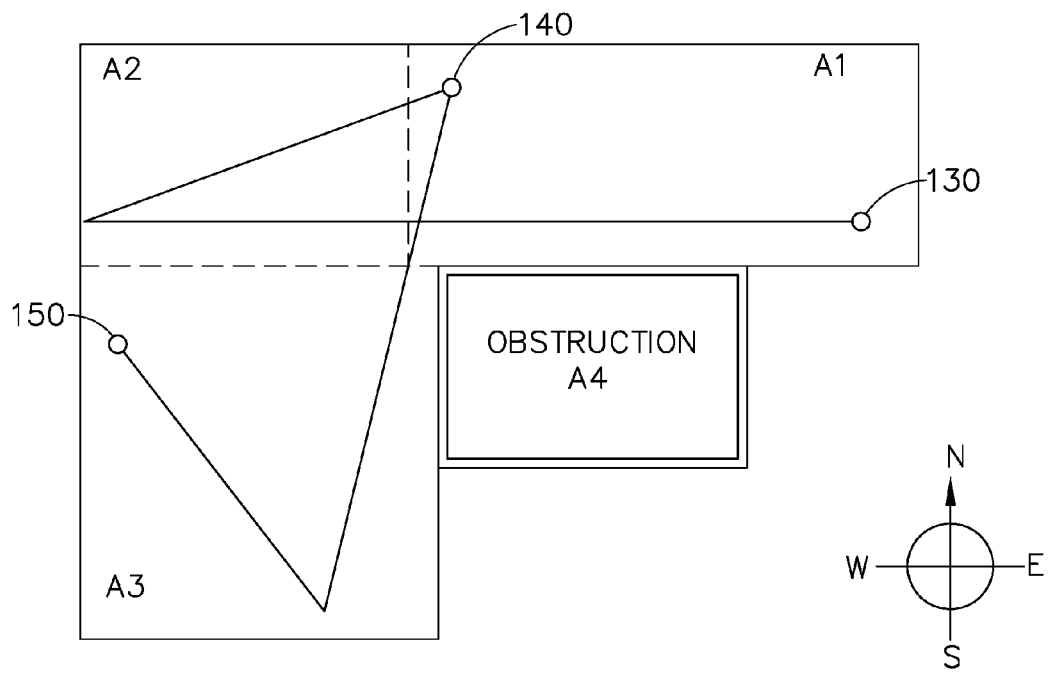
FIG. 18 is an elevational view of a jobsite floor with three base units positioned on the floor, in which some of the floor area is not accessible by all three base units because of an obstruction, but all points of the floor area are accessible by at least two of the base units.

Referring now to FIG. 18, this view illustrates the advantages of having the possibility of eliminating areas of blockage from jobsite obstructions. On FIG. 18, the floor plan area that is to be laid out is L-shaped, and has been broken into three main areas: A1, A2, and A3. There is an existing obstruction at the intersection of the two arms of the "L", and that obstruction is designated by the area A4. In this example, the first base unit 130 has been placed in the southeast corner of area A1, the second base unit 140 has been placed in the northwest corner of area A1, and the third base unit 150 has been placed in the northwest corner of area A3.

In general, the points in the jobsite floor surface for area A1 can be laid out using the first two base units 130 and 140. The only negative consideration in this example would be if the points to be laid out are very near the alignment axis between base units 130 and 140, because the angles of intersection would then be quite shallow, and perhaps a little bit more difficult to determine exactly where the intersecting point is, when viewing that point on the jobsite floor. This example of FIG. 18 does not address that particular concern.

On the other hand, most of the points of the area A3 could not be possibly laid out using the current positions of the base units 130 and 140, mainly because the obstruction A4 would block almost the entire floor area of area A3 from receiving laser light from the base unit 130 at its particular placement that is shown on FIG. 18. Therefore, either the base unit 130 would have to be moved someplace else on the jobsite floor, or the third base unit 150 could instead be used. As can be seen, the base units 140 and 150 will be able to lay out almost all of the points of interest on the entire floor space of area A3. Once again, the only potential negative would be for points that are closely located along the alignment axis between base units 140 and 150, and (again) this example of FIG. 18 does not address that concern.

Finally, the area of the floor plan for area A2 can be laid out using virtually all three of the laser transmitters on base units 130, 140, or 150. In this situation, the other considerations would probably control to decide which of the two base units should be used for any particular point of interest in area A2. One consideration is the nearest of the two base units to have the brightest intensity of light at a particular intersecting point in area A2. Another consideration is the shallow angle criterion that was briefly mentioned in the previous two paragraphs. For area A2, that criterion is a consideration that can be addressed fairly easily using all three of these base units. As an example, if the intersecting angles of the two laser fan beams are greater than 20 degrees, that situation would normally provide a very satisfactory or sufficient set of laser light lines to use for laying out a particular point of interest.

It will be understood that the three base units would each have a laser transmitter that typically modulates at a different frequency from any of the other two laser transmitters of these three base units. This allows each of the base units to know exactly which of the other laser transmitters is pointing its fan beam at the 360-degree sensor that is positioned on top of each of the base units, thereby letting that particular base unit know exactly which laser transmitter is pointing at it, at a particular time. Even if both of the other two laser transmitters are aiming at that particular base unit's 360-degree sensor, it is still important to know which modulation frequency is being used so that the third base unit can control the movements of the other two fan beams of the other two base units, as necessary.

Referring now to FIG. 19, a jobsite floor is depicted, generally designated by the reference numeral 202. There are five I-beams that have been positioned in the north region of this floor plan, designated by the reference numerals 210, 212, 214, 216, and 218. In this example, three five I-beams are vertical uprights, and they are all positioned along the same east-west line, which could become a chalk line, for the purposes of laying out this jobsite floor. As described above (in reference to FIG. 16), a typical first step would be to create a second chalk line that is offset by a particular distance and is parallel to the first chalk line that would go through the center of the five upright I-beams mentioned above. These chalk lines are not shown on FIG. 19, because they are not necessarily the way a particular worker would proceed. What is necessary, is the positioning of two control points at 220 and 222, and then the positioning of three base units 230, 240, and 250.

As according to the descriptions above in reference to FIGS. 16 and 17, the base units are first set up to the two control points 220 and 222, and normally there would be just two of the base units for that initial setup. Once the first two base units are set up, then the third base unit can be positioned anywhere on the jobsite floor, and using the special routine in the APP or software used for of each of the base units, that third base unit would be automatically set up to the first two base units. This is the point in the layout procedure that is depicted on FIG. 19. Typically, the third base unit would be placed at a location on the jobsite floor that is farther from the two control points 220 and 222 than the first two base units 230 and 240; in other words, the position 250 for the third base unit is the most distal position of all three base units at this initial portion of the jobsite layout procedure. If the first two base units are placed at fairly close distances from the control points 220 and 222, then there would not seem to be much point in placing the third base unit more proximal to the control points than those first two base units. Normally, there would need to be a special reason to place the third base unit nearer to the control points—such reason could be a small obstruction on the jobsite floor, for example.

As can be seen, these placements on FIG. 19 for the laser base units perhaps may successfully (or easily) lay out only a small portion of this huge jobsite floor, and essentially might be restricted to working only in the northwest corner of that floor (in this example). This view of FIG. 19 may give the reader an idea of how daunting a task it is to layout points of interest on a large "bare" jobsite floor, especially using the conventional surveying and point laying out techniques.

Referring now to FIG. 20, the jobsite floor 202 that was depicted on FIG. 19 is again illustrated, and this time it is designated by the reference numeral 200. In general, FIG. 20 will show the positions of the base units as they move throughout the jobsite floor to lay out all of the points everywhere on the floor, in a sequence. Starting at the positions that were illustrated on FIG. 19, the three base units 230, 240, and 250 are all positioned in the upper left corner, which is the northwest corner of this floor plan. Right now (after initial setup, as per FIG. 19) these units are all aligned to the two control points 220 and 222, as can be seen by the X-lines that intersect those control points.

Once all of the points of interest have been laid out in that initial sector in the northwest corner, it is time for one of the base units to be moved to a new physical location. Assuming that the worker or workers wish to move down on this drawing, which is to the south, then the base unit 230 will be lifted from the floor and moved to a new position, at the reference numeral 231. Once the worker has placed the base unit at 231, the worker can enter a command so that this base unit at 231 will automatically align with the other two base units 240 and 250. When this occurs, base unit 231 automatically is again set up to the virtual floor plan, and can now lay out new points.

The sequence will continue all the way down (to the south) of the floor plan, and once the base units reach the bottom left (or southwest) corner, it is time to turn east and move toward the southeast corner. After that has occurred, then it is time to move up the floor plan, which is to the north, finally ending up in the northeast corner. By way of an example, the movements of the base units would be as follows, base unit 240 moves to position 241; base unit 250 moves to position 251; the base unit at 231 move to position 232; the base unit at 241 moves to position 242; the base unit at 251 moves to position 252; the base unit at 232 moves to position 233; the base unit at 252 moves to position 253; the base unit at 233 moves to position 234; the base unit at 242 moves to position 243; the base unit at 253 moves to position 254; the base unit at 243 moves to position 244; the base unit at 234 moves to position 235; the base unit at 254 moves to position 255; the base unit at 244 moves to position 245; the base unit at 235 moves to position 236; the base unit at 255 moves to position 256; the base unit at 245 moves to position 246; the base unit at 236 moves to position 237; and finally, the base unit at 256 moves to position 257.

As can be seen from this example, once it has been determined that it is time to move one of the three base units that are already aligned to the virtual floor plan, one would normally select the base unit that is farthest from the point where the next series of layouts is to occur. Therefore, the first movement was the base unit at 230 to be moved to the position at 231. At this point in the proceeding, the base unit at 230 was the farthest base unit from that next series of points to be laid out, which was to the southeast, and hence, the base unit 230 essentially moved across the alignment axis between the base units 240 and 250, and was positioned at a point that was almost equidistant from the axis between base units 240 and 250 on the opposite side of that alignment axis.

Note that there is no exact precision necessary for these movements of the base units. The workers merely need to pick up one of the three base units and move it anywhere they want on the jobsite floor and then hit a command on the system remote control unit telling the three base units to reestablish their alignment axes with one another. Since two of the base units have not been moved, those two base units already know exactly where they are on this floor plan, and therefore, they can be used to find the third base unit that has just been moved and automatically determine its new position. Once that position becomes known, the third base unit automatically is informed of all of this information and knows its coordinates on the virtual floor plan, and also has established two new alignment axes with the other two base units. This is important because it will probably be one of those other two base units that will be moved next.

As noted above, the sequence of movements is strictly up to the user or workers on the jobsite floor, and would not necessarily have to follow the pattern described in reference to FIG. 20. Instead of going "down" from north to south, and then crossing over toward the east at the bottom (on FIG. 20) of the jobsite floor, the user could have gone west to east immediately after the first three base units were positioned at the locations 230, 240, and 250, if desired. This could have lead to a back and forth and up and down situation, and this all depends on the worker's preference, or perhaps due to other constraints in the real world of this jobsite. For example, if the southernmost portions of the floor have yet not had concrete poured, then obviously there's no point in trying to immediately lay out points to the southern regions of the floor plan, although the more northern floor plan points could be laid out.

Details of System Hardware

Figure 21:
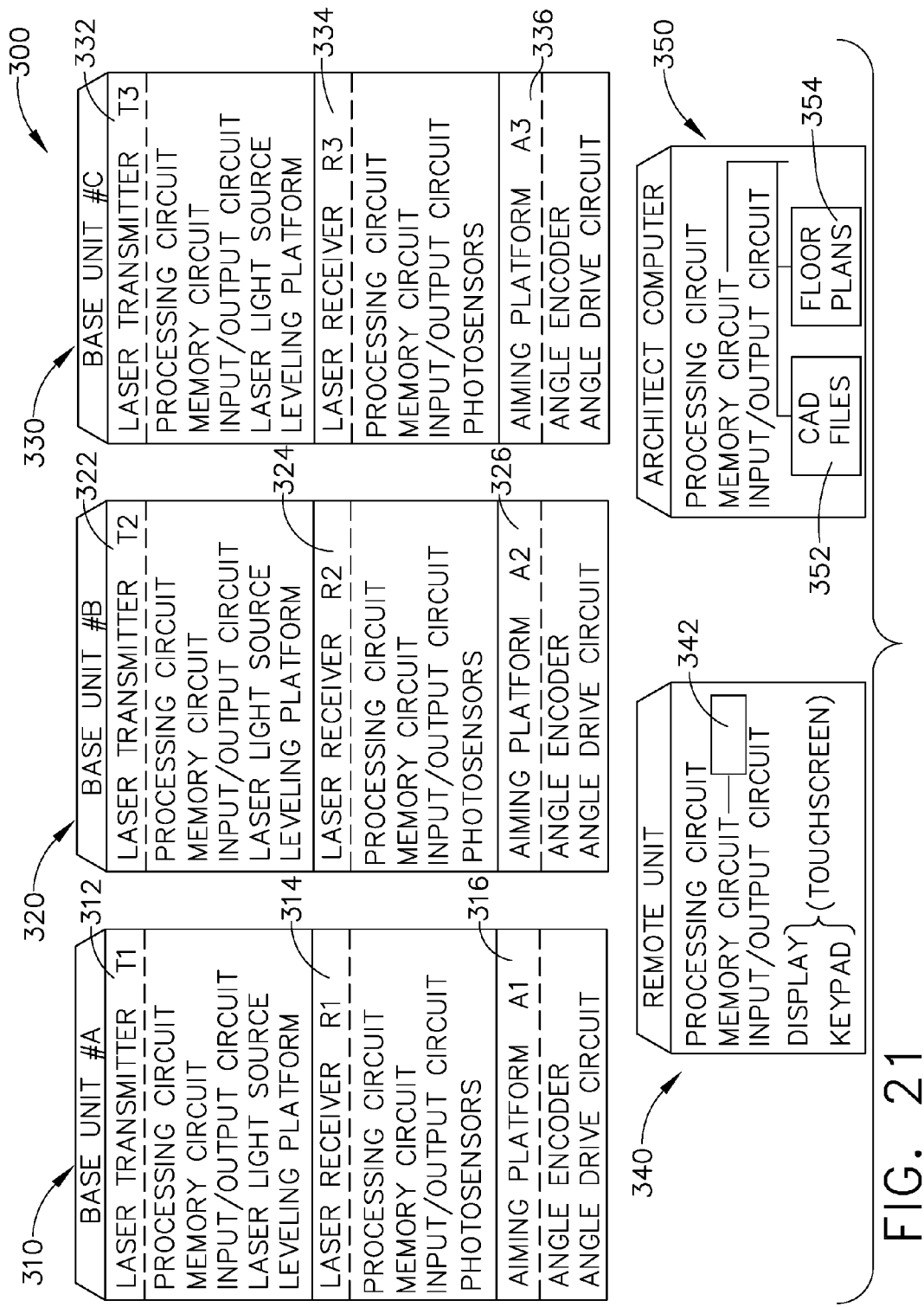
FIG. 21 is a block diagram of the major components of a layout and point transfer system, as constructed according the principles of the technology disclosed herein.

Referring now to FIG. 21, an entire layout and point transfer system, generally designated by the reference numeral 300, is depicted in block diagram form. A first base unit is generally designated by the reference numeral 310, and is also referred to on FIG. 21 as "BASE UNIT #A." A second base unit is generally designated by the reference numeral 320, and is also referred to on FIG. 21 as "BASE UNIT #B." A third base unit is generally designated by the reference numeral 330, and is also referred to on FIG. 21 as "BASE UNIT #C."

Base unit 310 includes a laser transmitter "T1," at reference numeral 312. Laser transmitter 312 includes a processing circuit, a memory circuit, an input/output circuit, a laser light source, and a leveling platform.

Base unit 310 contains a laser receiver "R1," in a preferred mode of this system. This laser receiver is also designated by the reference numeral 314, and includes a processing circuit, a memory circuit, an input/output circuit, and at least one photosensor. Different configurations of photosensors can be used for this laser receiver, as discussed below in greater detail.

Base unit 310 further includes an aiming platform "A1," which is designated by the reference numeral 316. This aiming platform includes an angle encoder (acting as an "aiming angle sensor"), and an angle drive circuit. This aiming platform 316 will be described in greater detail below, in the paragraph about leveling platforms.

Base unit 320 includes a laser transmitter, in this instance referred to as "T2," and designated by the reference numeral 322. Laser transmitter 322 also includes a processing circuit, memory circuit, input/output circuit, laser light source, and a leveling platform.

Base unit 320 also includes a laser receiver referred to as "R2," and generally designated by the reference numeral 324. This laser receiver also includes a processing circuit, memory circuit, input/out circuit, and photosensors.

Base unit 320 also includes an aiming platform, referred to as "A2," and generally designated by the reference numeral 326. This second aiming platform includes an angle encoder, and an angle drive circuit. These are similar to the same types of devices in the aiming platform 316, and will be discussed below in greater detail, in the paragraph about leveling platforms.

Base unit 330 includes a laser transmitter, in this instance referred to as "T3," and designated by the reference numeral 332. Laser transmitter 332 also includes a processing circuit, memory circuit, input/output circuit, laser light source, and a leveling platform.

Base unit 330 also includes a laser receiver referred to as "R3," and generally designated by the reference numeral 334. This laser receiver also includes a processing circuit, memory circuit, input/out circuit, and photosensors.

Base unit 330 also includes an aiming platform, referred to as "A3," and generally designated by the reference numeral 336. This second aiming platform includes an angle encoder, and an angle drive circuit. These are similar to the same types of devices in the aiming platform 316 (discussed below in greater detail, in the paragraph about leveling platforms).

The system 300 also includes a remote unit, which is generally designated by the reference numeral 340 on FIG. 21. Remote unit 340 includes a processing circuit, a memory circuit, an input/output circuit, a display, and a keypad. Alternatively, remote unit 340 could include a touch screen display which would incorporate the main functions of a keypad, without having a separate keypad on the unit. The memory circuit of remote unit 340 can have two components: a first internal component, and either an external component or a "bulk memory" component, which is designated by the reference numeral 342 on FIG. 21. The external characteristic of memory circuit 342 could be comprised of a flash memory or other type of portable memory device, such as a "stick ROM." Such a portable memory device could be carried by a user, and could be plugged into a port of the remote unit 340, if desired. This will be discussed in greater detail below.

The remote unit 340 could comprise a tablet computer, a laptop computer, or a smart phone, for example, using the terminology of today's popular portable computers. Whatever the exact physical form of the remote unit, it will require operating (i.e., executable) software to properly function in the system 300. In today's popular terminology, such executable software is typically referred to as an "APP."

Another possible component of system 300 is a computer generally designated by the reference numeral 350. This computer is referred to as an "ARCHITECT COMPUTER," on FIG. 21. Although the owner of computer 350 may or may not truly be an architect, for the purposes of this description, it will be assumed that computer 350 includes floor plans or some other type of computer files that were either created or used by an architect, or by some type of building engineer. This assumes that the system 300 is going to be used for a jobsite in which a building will be constructed. Of course, other types of structures or perhaps highways can use the technology disclosed herein, and such a jobsite may not have any type of enclosed building structure at all.

The computer 350 includes a processing circuit, a memory circuit, and an input/output circuit. The memory circuit of computer 350 will either contain floor plans (designated at 354), or some other type of computer files such as computer-aided drafting (CAD) files at 352, on FIG. 21. It should be noted that the remote unit 340 itself could have some type of computer-aided architecture or CAD software installed thereon (depending on how "powerful" the computer/memory system is for the remote unit), and in that event, the virtual floor plan could also be directly contained in memory circuit 342, and displayed in two, or perhaps three dimensions.

It will be understood that all of the main units illustrated on FIG. 21 include some type of input/output circuit, and these types of circuits include communications circuits. Such communication circuits possibly could be plug-in ports, such as USB ports; moreover, such input/output circuits also can include wireless communications circuits, such as low power radio-frequency transmitters and receivers, or other types of wireless communications ports that use other wavelengths, such as infrared light, for transmitting and receiving data between the various units. This type of technology is already available today, although certainly there will be newer forms invented in the future, that can still be used in the system 300 of FIG. 21.

Figure 22:
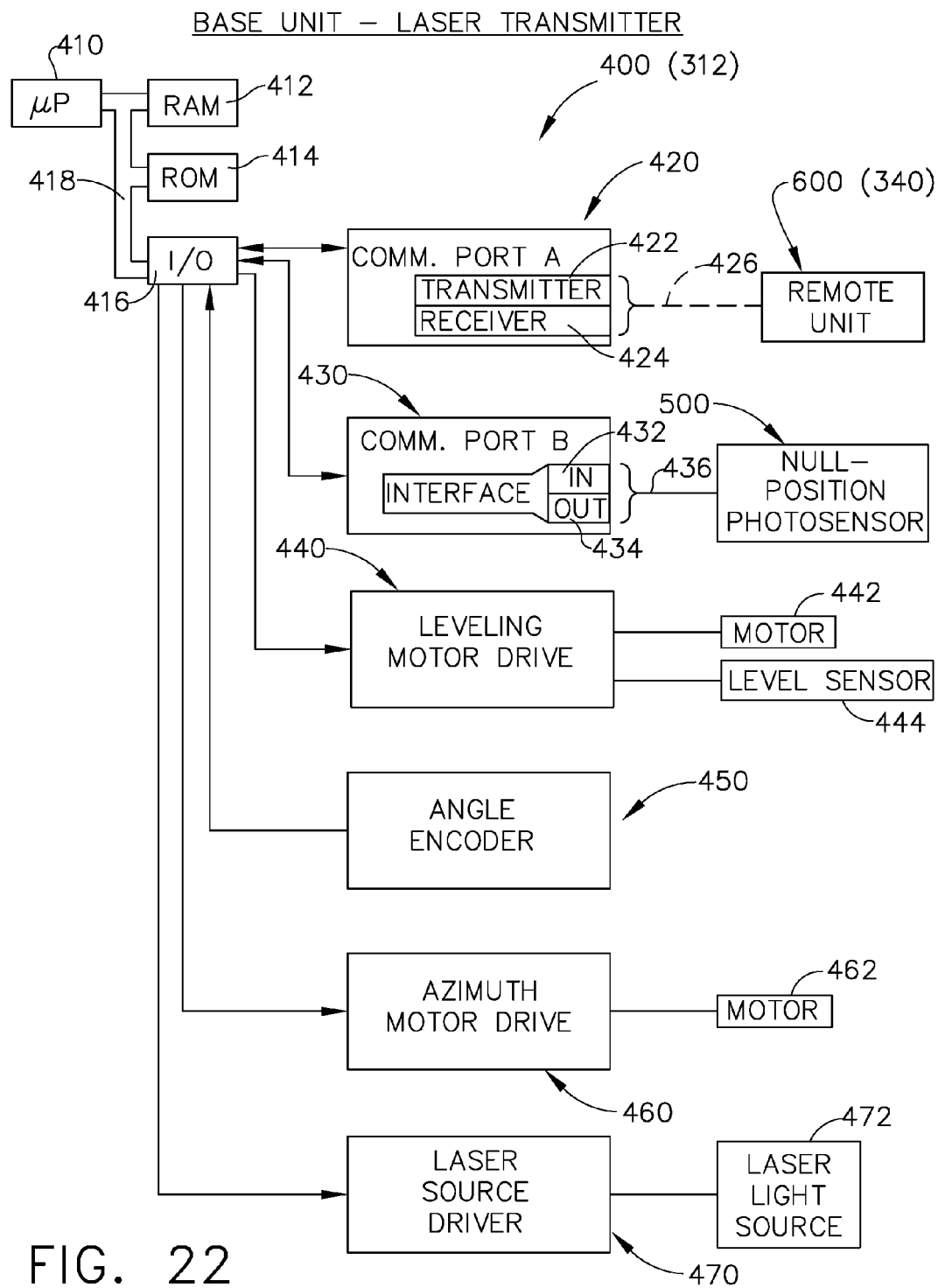
FIG. 22 is a block diagram of the major components of a laser transmitter that is part of a base unit depicted in FIG. 21.

Referring now to FIG. 22, a block diagram of a laser transmitter used in one of the base units is illustrated, and is generally designated by the reference numeral 400. Laser transmitter 400 includes a processing circuit 410, which will have associated random access memory (RAM) at 412, associated read only memory (ROM) at 414, and at least one input/output circuit at 416. These devices 412, 414, and 416 communicate with the processing circuit 410 by use of a bus 418, which typically is referred to as an address bus or a data bus, and can also contain other types of signals, such as interrupts and perhaps other types of timing signals.

The input/output circuit 416 will sometimes also be referred to herein as an I/O circuit. This I/O circuit 416 is a primary interface between the real world devices and the processing circuit 410. It is in communication with various communications devices and also various types of motor drive circuits and sensor circuits.

The input/output circuit 416 is in communication with a communications port A, which is generally designated by the reference numeral 420. Communications port 420 includes a transmitter circuit 422 and receiver circuit 424. Communications port 420 is provided to exchange data information with the remote unit 340, which on FIG. 22 is also referred to as the remote unit 600. The communication link between remote unit 600 and communications port 420 is designated by the reference numeral 426. In a preferred mode of this system, the communication link 426 will be wireless, although certainly a cable could be connected between the communications port 420 and the remote unit 600, if desired.

A second communications port, referred to as port B, is generally designated by the reference numeral 430 on FIG. 22. This port 430 comprises a data interface with an input circuit at 432 and an output circuit at 434. Communications port 430 transfers data to and from a null-position photosensor, generally designated by the reference numeral 500, using a communication path 436. While it would be possible for communication link 436 to be wireless, there is no particular need for that to be so. The null-position photosensor 500 will typically be mounted directly on the base unit, as will be the laser transmitter 400. Therefore, a direct "wired" link will be typical.

Laser transmitter 400 also includes a leveling motor drive circuit, generally designated by the reference numeral 440. This drive circuit provides the voltage and current for a leveling motor 442. In addition, it receives signals from a level sensor 444, and these input signals will determine what types of commands will be sent to the motor 442 from the drive circuit 440. If desired, this can be a self-contained system that may not need to communicate with the processing circuit 410. However, the laser transmitter 400 will typically desire knowledge of whether or not the base unit has actually finished its leveling function before the laser transmitter 400 begins to function in its normal mode of operation. In addition, the processing circuit 410 may well desire to control the leveling motor drive circuit 440, essentially to keep it de-energized at times when it is not critical for the base unit to actually be attempting to level itself with respect to gravity.

Laser transmitter 400 also includes an angle encoder 450, in a preferred embodiment. Angle encoder 450 will provide input signals to the processing circuit 410, so that it knows exactly where the laser transmitter is being pointed with respect to the azimuth direction. This could be a wholly manual operation, if desired to reduce system cost by eliminating the encoder. However, for a fully automated system, the angle encoder 450 will be necessary.

Laser transmitter 400 preferably will also include an azimuth motor drive, generally designated by the reference numeral 460. Motor drive 460 will provide the proper current and voltage to drive the azimuth motor 462, which is the motive force to aim the laser transmitter. This again could be part of a self-contained system, working with the angle encoder 450; however, on FIG. 22, it is illustrated as being controlled by the processing circuit 410.

Laser transmitter 400 also includes a laser light source driver circuit 470, which provides the current and voltage to drive a laser light source 472. This typically will be a laser diode, although, if desired, it could be an other type of laser light beam emitter. As described above, the laser light source will typically be emitting visible light, although a non-visible light source could be desirable for certain applications, and a laser light source emitting infrared light could be used in that situation. The laser source driver 470 is controlled by processing circuit 410 in the configuration illustrated on FIG. 22.

The laser transmitter 400 will typically be a "fan beam" laser transmitter for use in the system 300. However, it will be understood that other types of laser light sources could be used, including a rotating laser beam, if desired. However, there must be some minimum amount of divergence to create a laser light "plane" so that the laser light will at least intersect the floor surface of a jobsite, and preferably also intersect a ceiling surface for enclosed spaces on jobsites. The system 300 will have many uses, even if the laser light source only is pointing at a floor surface, but system 300 expands its usefulness if the divergence angle of the laser plane is designed to intersect not only the floor, but also the ceiling of the enclosed space. In this description, it will be assumed that the laser light source is a fan beam laser, and so a continuous plane of laser light is being emitted by each laser transmitter 400 at all three base units 310, 320, and 330.

Figure 23:
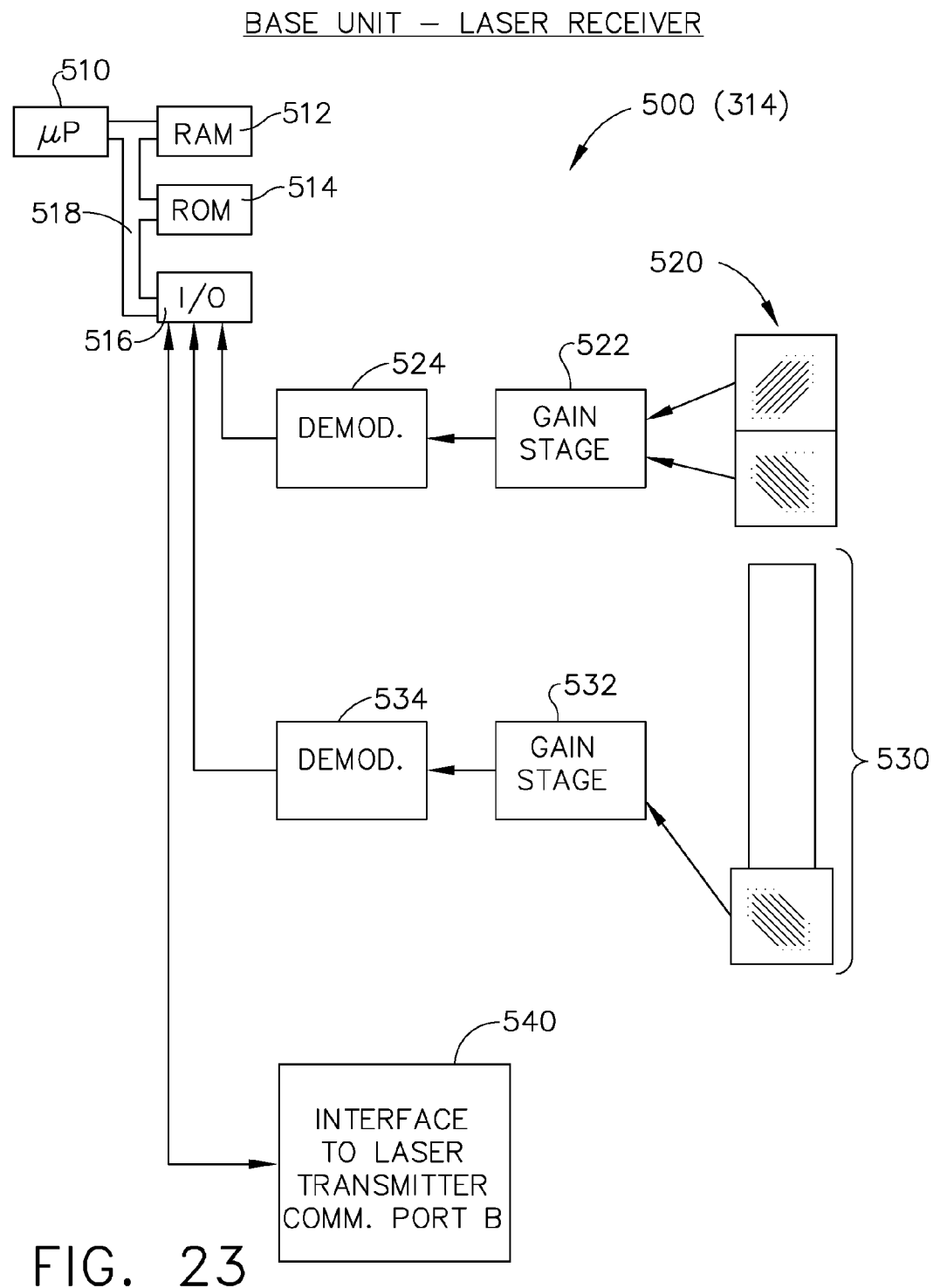
FIG. 23 is a block diagram of the major components of a laser receiver that is part of a base unit that is depicted in FIG. 21.

Referring now to FIG. 23, a laser receiver generally designated by the reference numeral 500 is depicted in block diagram form. Laser receiver 500 includes a processing circuit 510, which has associated RAM 512, ROM 514, and an input/output interface circuit 516. These devices are in communication with the processing circuit 510 over a bus 518, which typically includes at least data and address lines.

The input/output circuit 516 receives signals from some type of photosensor. On FIG. 23 two different types of photosensors are depicted. A "butt end" photosensor is depicted at the reference numeral 520, and this assumes there are only two individual photocells. Each of these photocells of the photosensor 520 provides an electrical signal to a gain stage 522. The output of the gain stage is directed to a demodulation circuit 524, and the output of that circuit directs a signal to the I/O circuit 516. It will be understood that a demodulation circuit will not be necessary unless the laser light signals themselves are of a modulated type of signal. In most applications for the system 300, a modulated laser light signal will be desirable, and thus a demodulation circuit 524 will be used in those instances.

The second type of photosensor is an omni-directional device that can detect light that is received from all angles of the compass. On FIG. 23, this omni-directional photosensor is depicted as a portion of what is sometimes referred to as a "rod sensor" and is designated by the reference numeral 530. An exemplary "full" rod sensor is disclosed in U.S. Pat. No. 7,110,092, which issued on Sep. 19, 2006, which disclosure is incorporated by reference herein in its entirety. It will be understood that the second photosensor 530 can comprise virtually any type of "all-around" light-sensing device, i.e., a photosensor that is able to detect incoming light from essentially any angle.

A typical "full" rod sensor would have two photocells, one at each end of the light-conducting rod. However, rod sensor 530 has only a single photocell in FIG. 23, which produces an electrical signal that is directed to a gain stage 532, which outputs a signal to a demodulation stage 534. As in the other type of photosensor circuit described above, the demodulation circuit 534 is only necessary if the laser light source emits a modulated signal, which would be typical for this system 300.

An alternative type of "all-around" light sensing device, sometimes referred to as a "360 degree" photosensor, will also be available from Trimble Navigation Limited, for use with base units 400. This exemplary sensor is disclosed in Published Patent Application US 2016/0116138 A1, which published on Apr. 28, 2016, and which disclosure is incorporated by reference herein in its entirety.

An interface circuit 540 is also provided in the laser receiver 500. This is a separate interface circuit from the I/O circuit 516. Interface circuit 540 communicates position information to the laser transmitter communications port B, which will be used in helping "aim" the laser transmitters during a portion of the setup procedure (or mode of operation), as discussed below.

Figure 24:
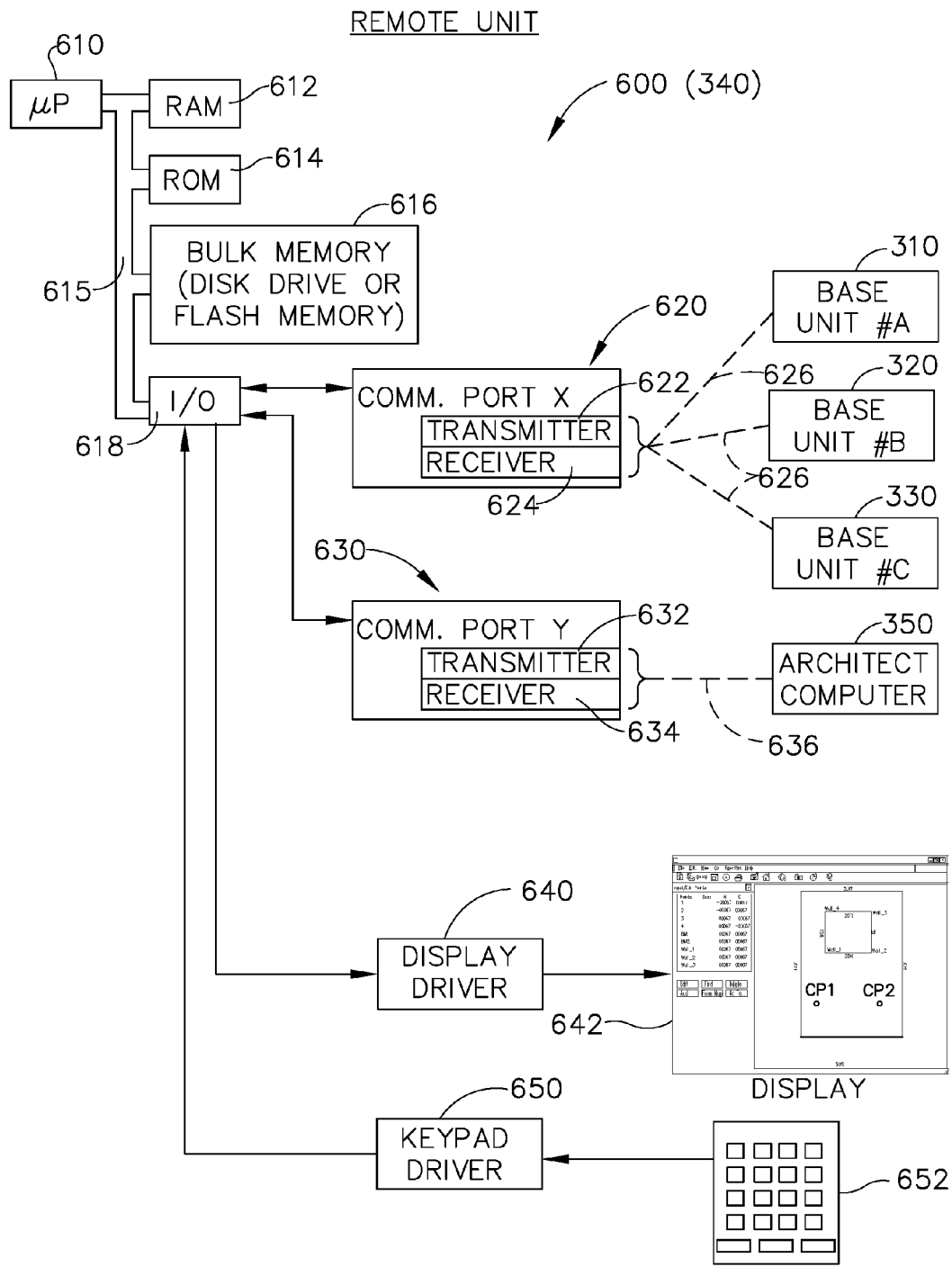
FIG. 24 is a block diagram of the major components of a remote unit that is part of the system of FIG. 21.

Referring now to FIG. 24, a block diagram is provided for a remote unit, which is generally designated by the reference numeral 600. Remote unit 600 includes a processing circuit 610, with associated RAM 612, ROM 614, some type of bulk memory or external memory 616, and an input/output circuit 618. These circuits are all in communication with the processing circuit 610 via a bus 615, which normally would carry data signals and address signals, and other types of microprocessor signals, such as interrupts.

On FIG. 24, the communications between the remote unit 600 and the multiple base units 500 typically is wireless, such as using a WiFi signal format. The remote unit can be a standard tablet computer or a smart phone, for example, with a custom APP installed to work in the Point Layout System. A standard tablet computer typically includes a WiFi transmitter/receiver circuit 620, so the WiFi format should work well if each of the base units 500 includes a compatible wireless transmitter/receiver circuit.

The bulk memory 616 could be a disk drive, or perhaps some type of flash memory. If in the form of flash memory, it could be an external memory device (such as a "portable memory device") that can plug into the remote unit, via a USB port, for example. In that situation, there would be a USB interface between the bulk memory device 616 and the bus 615.

The I/O circuit 618 will be in communication with a first communications port 620, which is designated as communications port "X" on FIG. 24. Communications port 620 includes a transmitter circuit 622, and a receiver circuit 624. Communications port 620 is designed to communicate with the base units 310 and 320, typically using a wireless signal via a wireless pathway 626 (as noted on FIG. 24). As described in greater detail below, the base units 310 and 320 will communicate azimuth angular information with the remote unit, and that information arrives via the wireless path 626 to and from communications port 620.

A second communications port 630 is included in remote unit 600, and this is designated as communications port "Y" on FIG. 24. Communications port 630 includes a transmitter circuit 632 and receiver circuit 634. This communications port 630 is provided to exchange information with the architect computer 350, via a communication link 636. On FIG. 24, communication link 636 is depicted as a wireless link, although it certainly could be constructed by use of an electrical cable or an optical cable, if desired.

If wireless signals are not desired (or are not operating properly for some reason), then it is also possible to attach a USB cable between the remote unit 600 and each of the base units 500, as needed, to communicate messages between those units.

Assuming a virtual floor plan is available on an architect computer 350, then that floor plan can be downloaded to the remote unit 600 using an e-mail message, for example. In other words, if the virtual floor plan is stored in an office on a standard personal computer that never leaves the office, then the floor plan can be sent as a file to an e-mail address over the Internet. The tablet computer that acts as the remote unit 600 could be the home of that e-mail address (or could remotely access that e-mail address, if desired), and thus upload that file into the memory circuit (into RAM 612 or the Flash memory 616) of the remote unit 600. The format of that virtual floor plan is up to the architect, but typically it would be a two-dimensional or three-dimensional CAD file.

The block diagram of FIG. 24 includes some typical hardware for microprocessor-driven devices, such as tablet computers, as noted above. For example, the visual display 642 of a tablet computer or a smart phone would typically have a display driver circuit 640, and the keypad 652 would typically have a keypad driver circuit 650. It should be noted that the keypad 652 can be a virtual keypad, as would be typical for a touchscreen display (as found on many tablet computers and smart phones).

It should be noted that, although the block diagram for the remote unit 600 as depicted on FIG. 24 includes two separate communication ports "X" and "Y" (at communications circuits 620 and 630), it is clear that a single communications circuit could instead be used, in which the software of the remote unit's APP would control how and when that single communications circuit would send and receive messages to and from one of the base units 310, 320, or 330, or would send and receive messages to and from the architect computer 350.

Communications port 630 will exchange floor layout data with the architect computer 350; more specifically, it can receive a floor plan and store it in the bulk memory circuit 616. In addition, if the remote unit 600 receives information about a new or "unknown" point of interest in the physical jobsite floor plan, then that information can not only be saved in the bulk memory circuit 616, but could be also communicated back to the architect computer 350, via the communications port 630 to be placed in the original floor plan. Or, a revised floor plan (which includes the new point of interest) can be saved as a file in bulk memory circuit 616, and that entire file could be transferred to the architect computer 350.

It will be understood that the architect computer 350 could comprise a "fixed" unit that essentially remains in the architect's office, and passes data to the remote unit 600 while the remote unit is physically at the office, or perhaps they remotely communicate with one another via a wide area network, such as the Internet. Alternatively, the architect computer 350 could comprise a "portable" unit that is transported to the jobsite, and communicates with remote unit 600 while on site. Finally, as portable computers become even smaller in physical size, it is more likely that the portable unit and the architect computer will eventually become merged into a single device.

A display driver circuit 640 is in communication with the I/O circuit 618. Display driver circuit 640 provides the correct interface and data signals for a display 642 that is part of remote unit 600. If remote unit 600 is a laptop computer, for example, then this would be the standard display seen in most laptop computers. Or, perhaps the remote unit 600 is a calculator-sized computing device, such as a PDA (Personal Digital Assistant), in which case the display would be a much smaller physical device. Display 642 could be a touch screen display, if desired.

One example of a type of remote unit that could work in this system (with some modification) is the portable "layout manager," which is an existing hand held computer sold by Trimble Navigation Limited, Model Number LM80. It should be noted that one cannot simply take the LM80 and immediately use it as a remote unit in the present system; the software must be modified to perform the necessary calculations, which are described below. In addition, the input/output circuits must be modified to be able to communicate commands and data both to and from the base units.

A keypad driver circuit 650 is in communication with I/O circuit 618. Keypad driver circuit 650 controls the signals that interface to an input sensing device 652, such as a keypad, as depicted on FIG. 24. Again, if the display 642 is of a touch screen type, then there may not be a separate keypad on remote unit 600, because most of the command or data input functions will be available by touching the display itself. There may be some type of power on/off switch, but that would not necessarily be considered a true keypad (and typically would not be used for entering data).

Figure 25:
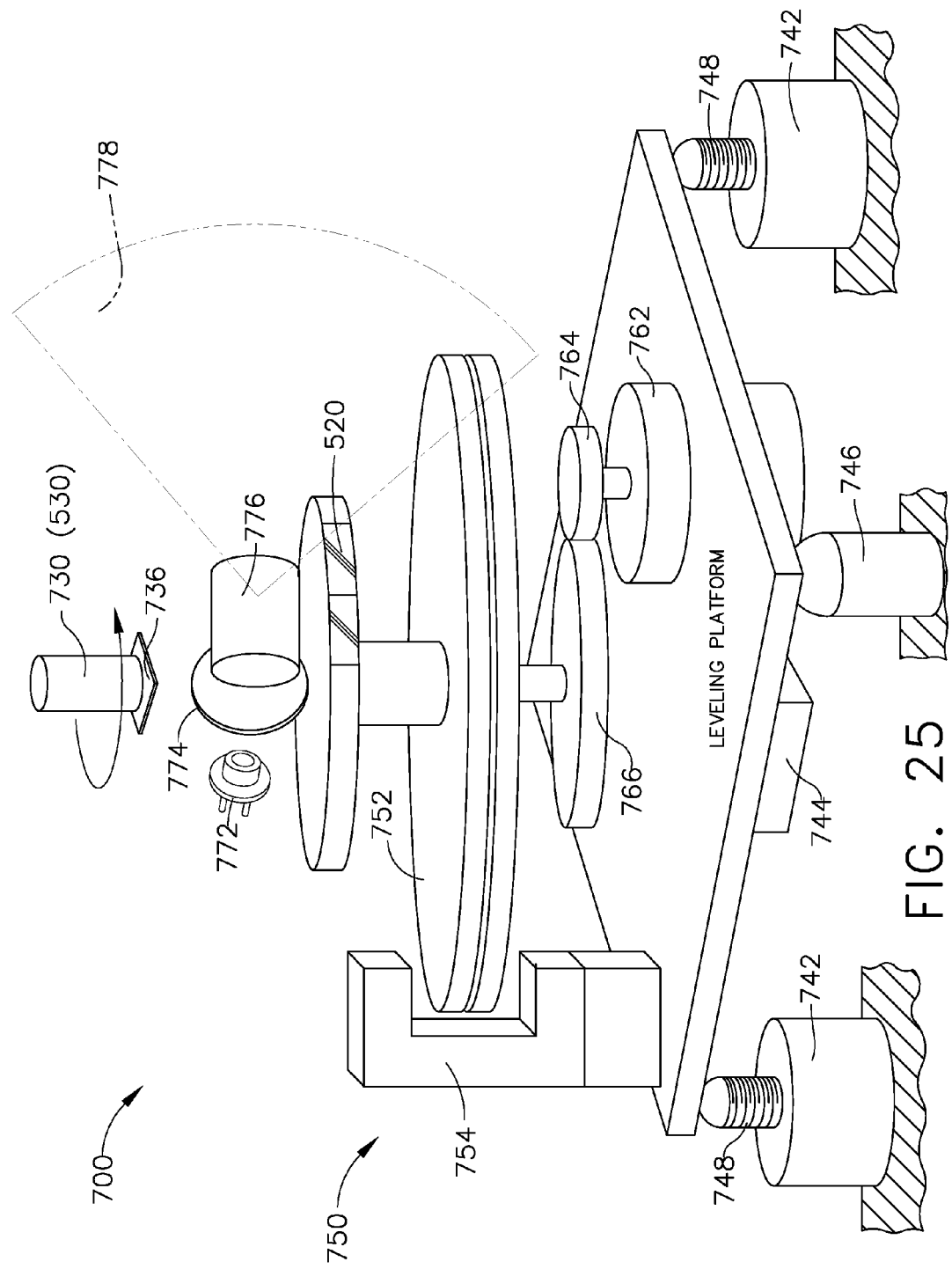
FIG. 25 is a diagrammatic view of an "automatic" base unit, as used in the system of FIG. 21.

Referring now to FIG. 25, a diagrammatic view is provided for the main "mechanical" components found in a base unit, including a laser transmitter and a laser receiver. The base unit is generally designated by the reference numeral 700, and includes a leveling platform at the bottom of the structure, upon which is mounted a rotational unit for adjusting the azimuth angle of the laser transmitter. The leveling platform includes two leveling motors 742, a level sensor 744 (e.g., some type of electronic gravity sensor), and a pivot 746. Above the leveling motors 742, are leadscrews 748, and the horizontal leveling platform is mounted on the top of the leadscrews 748.

It will be understood that a manual leveling platform could be provided with base unit 400, rather than the "automatic" leveling platform described in the previous paragraph. Such a manual leveling platform could use a pendulum or a visible bubble, for example, and there would be no automatic gravity sensing device or leveling motor drive.

On the upper surface of the leveling platform is the azimuth motor 762, which has output shaft and a pinion gear 764, which meshes with a spur gear 766. The spur gear has an output shaft that is vertical, which runs through an encoder disc subassembly 752 and up to a second wheel or disc that includes a pair of butt cell photosensors 520. The encoder disc subassembly 752 typically has some type of visible markings that can be detected by an encoder readhead, which is located along the outer perimeter of the encoder disc. On FIG. 25, the encoder readhead is designated by reference numeral 754, and the overall angle encoder system 750 includes both the encoder disc subassembly 752 and the encoder readhead 754. Typical optical encoders have a fixed portion and a rotatable portion, as depicted on FIG. 25 by the two parallel disc structures in subassembly 752.

A laser diode 772 is mounted (in this diagrammatic view) in the horizontal direction, and it emits a laser light beam through a collimating lens 774, and that laser light travels through a cylinder lens 776 to create an output fan beam 778. The fan beam 778 is diagrammatically presented on FIG. 25 as a diverging plane of laser light.

In this arrangement, the azimuth motor 764 turns the aiming direction of the fan beam laser plane of light 778, and this simultaneously moves the butt cell photosensors 520 (used as fine-positioning photosensors) and a portion of the encoder disc subassembly 752. In a typical arrangement, the split between the butt cell photosensors will be along the same vertical line as the edge view of the fan beam laser plane of light 778. However, it should be noted that the butt cell photosensors 520 could be somewhat offset from the centerline of the plane of laser light 778, and the calculations for determining positions of various points in the floor layout system could be adjusted by those offset calculations, especially for determining/establishing an alignment axis. This optional arrangement, sometimes referred to as "characterizing" the photosensors, can make it somewhat easier to construct the base unit, if desired.

A second photosensor is provided on FIG. 25. This is a "rod" sensor, and is depicted at reference numeral 730 (or 530). In this rod sensor, however, there is only a single photocell at 736. Although a typical position-sensing rod sensor would have two photocells (as depicted in FIG. 23), in the configuration of FIG. 25, the information being sought only requires a single photocell. In the base unit 400, the information being sought is whether or not laser light is impacting the rod sensor cylindrical surface, and if so, a single photocell at 736 will detect that event. On the other hand, if greater sensitivity is desired, or if the manufacturer wishes to use a standard rod sensor that already has two photocells mounted to the cylindrical rod (one on each end), then a standard rod sensor could be used, as depicted on FIG. 23. Alternatively, a "360 sensor" could be used for the second photosensor 730, as noted above.

As indicated on FIG. 25, the azimuth motor drive 762 can rotate the entire upper portion of the base unit in the horizontal plane; i.e., the rotational axis is essentially vertical, once the leveling platform has adjusted itself to making the system substantially horizontal with respect to gravity.

An alternative arrangement could be used to build a lesser expensive base unit 400. The photosensor 520 could be replaced by a small reflector that is precisely positioned to be in vertical alignment with the centerline of the plane of laser light 778. In this alternative embodiment, the opposite laser transmitter would have to be manually aimed at the reflector, when determining an alignment axis. This certainly would be more difficult to set up than the automated procedure that is described below, but it is possible, particularly for short-range situations in which the distance between the base units is relatively small. The laser receivers 314 and 324 could be entirely eliminated in this alternative embodiment.

Another way to reduce system cost is to eliminate the automatic azimuth aiming platform altogether, and instead rely on manual aiming of the laser transmitters for both base units. This second alternative embodiment would save the cost of the azimuth drive (including motor 762) and the encoder system 750. Of course, the "aiming" azimuth angles then would have to be read manually from an arcuate scale on the base unit, and these angles would have to be entered manually into the remote unit by the user every time the laser transmitter is aimed at a new control point, a known point of interest, or an unknown point of interest. The possibility of errors in data entry would increase, even if the azimuth angles are correctly read in the first place.

Flow Charts Describing System Use

Figure 26:
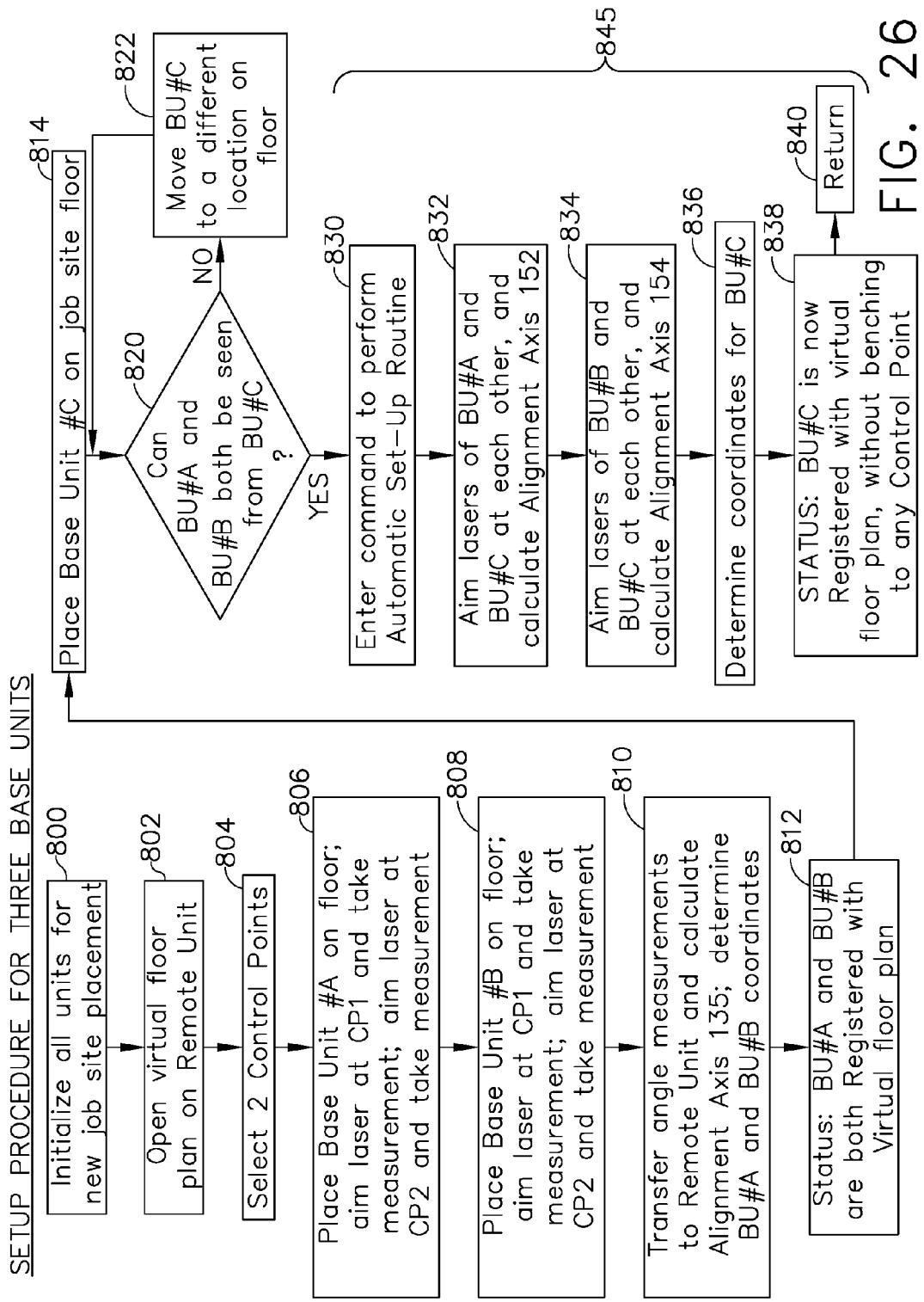
FIG. 26 is a flow chart of some of the important steps performed by a setup procedure using three base units of the type depicted in FIG. 21.

Referring now to FIG. 26, a flow chart is provided showing some of the important steps for a setup procedure involving three base units. At a first step 800, the electronic equipment is initialized for all base units for a new jobsite placement. In this example, it will be assumed that the user working on the jobsite floor will have a remote unit (such as the remote unit 340 described on FIG. 21) for use in controlling the base units, and also for opening a virtual floor plan. The user will also view the display of the remote unit to work with the virtual floor plan and with the three base units, and also with various control points and other points of interest on the jobsite floor. This step is 802 on FIG. 26.

The next step 804 is to select two control points on the jobsite floor. These are known points that are visible to the user working on the jobsite floor, and may be benchmarks, or other types of control points not necessarily referred to as benchmarks. These two control points must be known (registered) on the virtual floor plan as well, which means the user will be able to view them on the display of the remote unit.

The next step 806 requires the placement of the first base unit, referred to as Base Unit #A (or BU#A), on the jobsite floor at any appropriate physical location on the floor that is useful to the user. By "useful," this means that the Base Unit #A must be within visual distance and lacking obstructions to both of the control points that were selected in step 806. The laser transmitter is now aimed at Control Point #1 and will take a measurement. By "measurement," this refers to measuring the azimuth angle with respect to the Base Unit #A. If this is a "full function" base unit, such as a base unit 300 on FIG. 21, then the aiming platform will have an angle encoder (acting as an "aiming angle sensor"), and therefore, this measurement can be taken automatically.

Also as part of step 806, the laser transmitter on Base Unit #A is now aimed at Control Point #2, and that measurement will now be taken. Again, this refers to the azimuth angle between Base Unit #A and the laser transmitter's aiming angle when it is aimed at Control Point #2. It will be understood that, with the equipment provided in Base Unit #A, the laser transmitter T1 will be producing either a laser fan beam or a rotating laser line transmitter that creates essentially a laser plane, and this vertical laser plane will also produce a laser line along the floor. This laser line on the floor will be visible all the way to Control Point #1, and then to Control Point #2. When the measurements for the azimuth angles are sequentially taken, these laser lines should be directly crossing over the control points at CP1 and CP2, respectively.

At a step 808 on FIG. 26, the other base unit (in this case referred to as Base Unit #B) will be placed on the jobsite floor at a different physical location and somewhat spaced apart from Base Unit #A. As before, Base Unit #B (or BU#B) must be placed in a suitable physical location so that it can be aimed—without any obstructions—at both of the control points CP1 and CP2. The next step is to aim the laser transmitter from Base Unit #B at Control Point #1 and take a measurement of the azimuth angle. This is the same procedure as used in step 806 with respect to Base Unit #A. Finally, the laser transmitter at Base Unit #B is aimed at Control Point #2 and that measurement of azimuth angle is now taken.

The logic flow has reached a step 810, in which the angle measurements just taken by both Base Units #A and #B are now transferred to the remote unit. At this point, the software (or APP) in the remote unit can calculate an Alignment Axis 135 (see FIG. 16) between the two base units, BU#A and BU#B. With this information, the coordinates for both BU#A and BU#B are determined with respect to the virtual floor plan for this jobsite. This is done automatically (see FIG. 16 and FIGS. 5-10) once the alignment axis is known, with respect to the two initial control points CP1 and CP2.

At this point in the procedure, the status is that both BU#A and BU#B are registered with the virtual floor plan, as indicated at step 812 on FIG. 26. In this description, the act of being "registered" means that the position of a particular base unit has been determined by the software (or APP) that is running (executing) on the remote unit, with respect to the virtual floor plan for that jobsite. More specifically, being "registered" means that the coordinates of that particular base unit are now known, and that the software (APP) running on the remote unit has become aware of those coordinates, and has assigned some type of designator (e.g., BU#1) to those coordinates so that the user can view that position on the display screen of the remote unit, and also can visually understand that it is that particular base unit that is appearing on the display screen at that position on the virtual floor plan. The software (APP) may further allow the user to create his own specific designator name for any given base unit, or point of interest, on the virtual floor plan.

The next step in this procedure is a step 814, in which a third base unit, referred to as Base Unit #C (or BU#C), is placed on the jobsite floor. This placement is to be spaced apart from the first two base units BU#A and BU#B, and this third base unit (BU#C) can be placed some distance from not only the first two base units, but also from both of the control points CP1 and CP2.

In this setup procedure, a decision step 820 is now reached to ask if both base units A and B can be seen from Base Unit #C? If the answer is NO, then a step 822 requires Base Unit #C to be moved to a different physical location on the jobsite floor, and the logic flow goes back to the decision step 820 to ask the same question. If the answer is (or now becomes) YES, then at a step 830 a command is entered on the remote unit to perform an automatic set-up routine. This automatic set-up routine includes several steps. A first step 832 has the lasers of both Base Unit #A and Base Unit #C aiming at each other; this is an automatic procedure that was described above in connection with FIGS. 5-10. Once the lasers of both BU#A and BU#C are precisely aimed at each other, a new Alignment Axis 152 can be calculated.

Similarly at a step 834, the laser transmitters of both Base Units #B and Base Units #C are now aimed at each other, again using the automatic procedure described in the previous paragraph. Once the laser transmitters of BU#B and BU#C are precisely aimed at each other, an Alignment Axis 154 can be automatically calculated. These calculations are performed by the software in the remote unit, and also the remote unit creates the commands that are sent to the two base units, in which two base units at a time are aimed at each other to create their respective alignment axis.

Once the two Alignment Axes 152 and 154 are known, a step 836 can determine the jobsite coordinates for Base Unit #C, and these coordinates are with respect to the virtual jobsite floor plan for this particular jobsite that the user is working on.

At a step 838, the system status is now that BU#C has been registered with the virtual floor plan, and this occurred without benching to any of the control points on the jobsite floor. Instead, BU#C was registered completely without the control points, by instead creating alignment axes with the first two base units BU#A and BU#B. This automatic set-up routine is referred to by the reference numeral 845, and includes the steps 830, 832, 834, 836, and 838. Once all these steps have been performed, this routine ends at a step 840.

Figure 27:
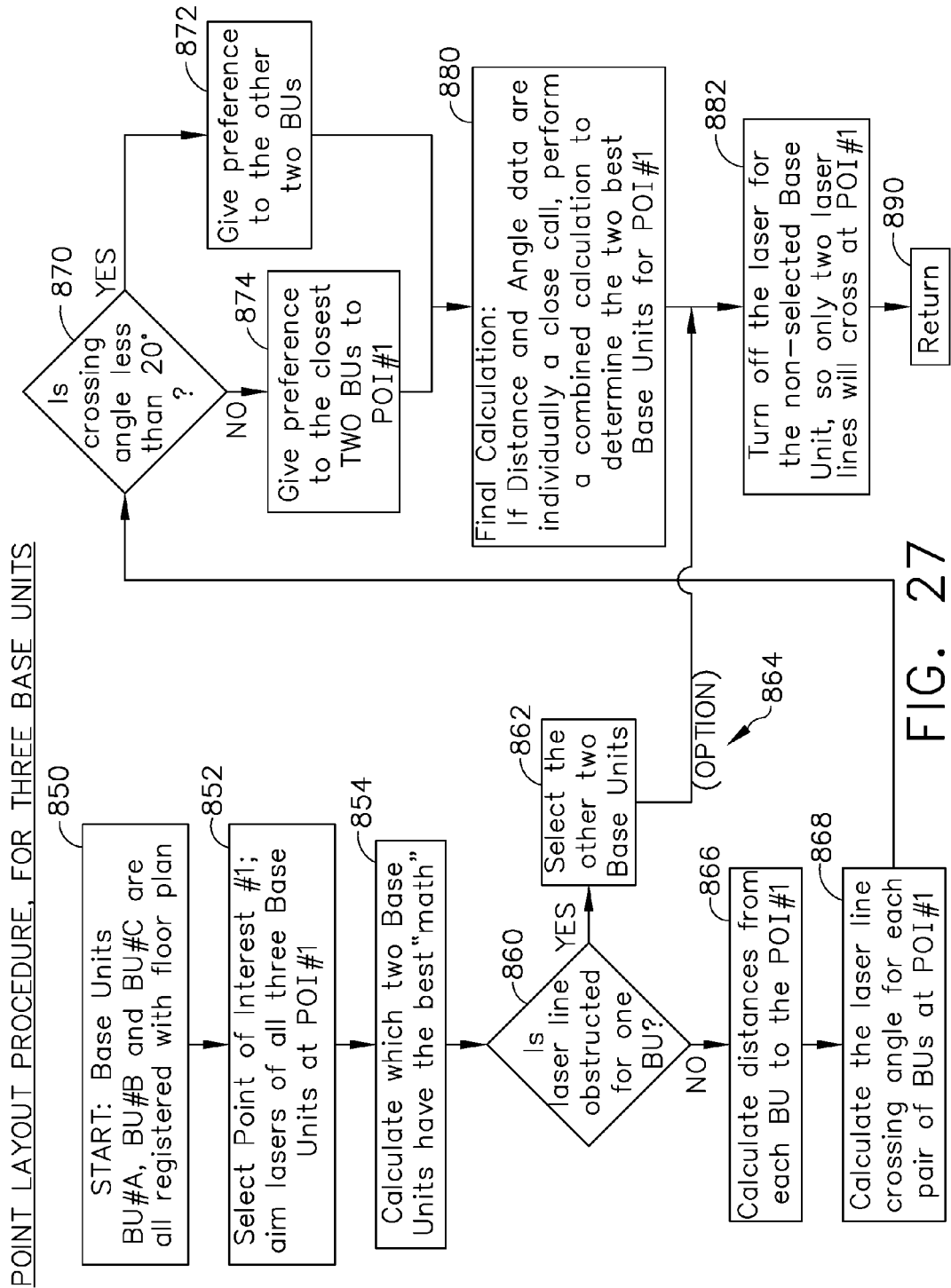
FIG. 27 is a flow chart of some of the important steps performed by a point layout procedure when using three base units of the type depicted in FIG. 21.

Referring now to FIG. 27, a flow chart is provided for a point layout procedure using three base units. Beginning at a step 850, all three base units have already been registered with the virtual floor plan on this particular job site. This is the same status as was discussed above in reference to step 838 of FIG. 26. At a step 852, a first point of interest is selected by the user, and the lasers of all three base units are aimed at this first point of interest (also referred to as POI#1). With all three laser transmitters aiming at POI#1, a step 854 will now calculate which of the two base units have the "best math." This concept of the "best math" has more than one consideration, and the remainder of this flow chart will reveal some of those considerations.

A decision step 860 now determines whether or not one of the laser lines is obstructed to this first point of interest. If the answer is YES, then a step 862 will select the other two base units for that first point of interest. This consideration is probably the most basic for determining the "best math," as the system obviously cannot be used with a particular pair of base units if one of their laser planes is obstructed before it reaches the point of interest. Moreover, this is not necessarily a "calculation" that is to be made by the remote unit, but instead, the user on the jobsite floor will visually be able to see whether or not all three laser lines actually reach the point of interest. The "obstruction" on the jobsite floor may not be a true wall or other vertical obstruction, but it could be something as simple as an undulation in the physical jobsite floor that prevents the laser light line of the fan beam of one of the base unit laser transmitters from actually touching the floor right at that point of interest. In other words, the "math" involved at the remote unit may think that a laser plane from a particular base unit should be revealed as a laser light line impacting the floor at that point of interest, but if the user cannot actually see any laser light line traveling directly over the point of interest, then that laser plane will turn out to be useless for that particular point of interest.

Assuming that none of the laser lines are obstructed for this point of interest, the logic flow arrives now at a step 866 that calculates the distances from each of the base units to the first point of interest. As will be discussed below, often the two nearest base units will provide the best laser light lines to a particular point of interest, but that is not necessarily the dispositive condition for determining which base unit to use.

The next step 868 now determines the laser line crossing angles for each pair of base units at the first point of interest. Since there are three different base units, each generating a vertical laser plane of light that creates a laser line along the jobsite floor, each pair of such base units will create its own individual crossing angle at the first point of interest. Therefore, the user has three different angles to choose from at Point Of Interest #1. This consideration can be even more important than the nearest distance between the nearest base units to the point of interest, as discussed below.

The next function of this flow chart is to determine whether the crossing angle is too shallow—e.g., less than twenty (20) degrees—for any one of the pair of laser light lines, which is determined at a decision step 870. If the answer is YES for any pair of light lines, then at a step 872, the system will give preference to the other pairs of crossing angles that exhibit "better" (i.e., larger) crossing angles. It will be understood that, even if the crossing angle is less than 20 degrees, the user can still see the visible laser light lines and the intersecting point. However, the shallower the angle, the somewhat more difficult it becomes to see exactly where that crossing point is along the length of the laser light lines. Hence, the preference should probably be given to one of the larger crossing angles.

More specifically, if one of the three crossing angles is less than 20 degrees, then the other two pairs of crossing angles may both be about the same, or one might be a much larger angle than the other. However, so long as both of the other two crossing angles are sufficiently large, then the system may want to give preference to the two nearest base units to the point of interest, if those two closest base units produce an acceptable crossing angle. That consideration is analyzed at a step 874 on this flow chart. The operating software (the APP) in the remote unit can make these determinations automatically, if desired. Alternatively, the user on the jobsite floor may wish to make this decision manually, or at least have the capability of overriding an automatic determination by the remote unit, in a situation where the user actually feels that a different angle and pair of laser light lines produces a better result. This can all be part of the operating software of the remote unit.

All these considerations are taken into account in a final calculation at a step 880. If the distance and angle data are individually a close call, the remote unit software can perform a combined calculation to determine the two best base units for the first point of interest. Again, the user may wish to override that determination, if desired. Once the determination has been made as to which two of the laser light lines will be used at Point Of Interest #1, then the system can automatically turn off the laser for the non-selected base unit, so only the other two of the laser lines will cross at POI#1, which is a little bit less confusing than seeing all three laser lines crossing simultaneously. This could be an automatic operation, or it could be manually overridden, if desired. Moreover, this turning off feature could be an option 864, that is derived from the step 862 that selected the two base units that did not have an obstruction for one of the laser lines. This point layout procedure for the first point of interest has now come to the end of this routine, at a step 890.

Figure 28:
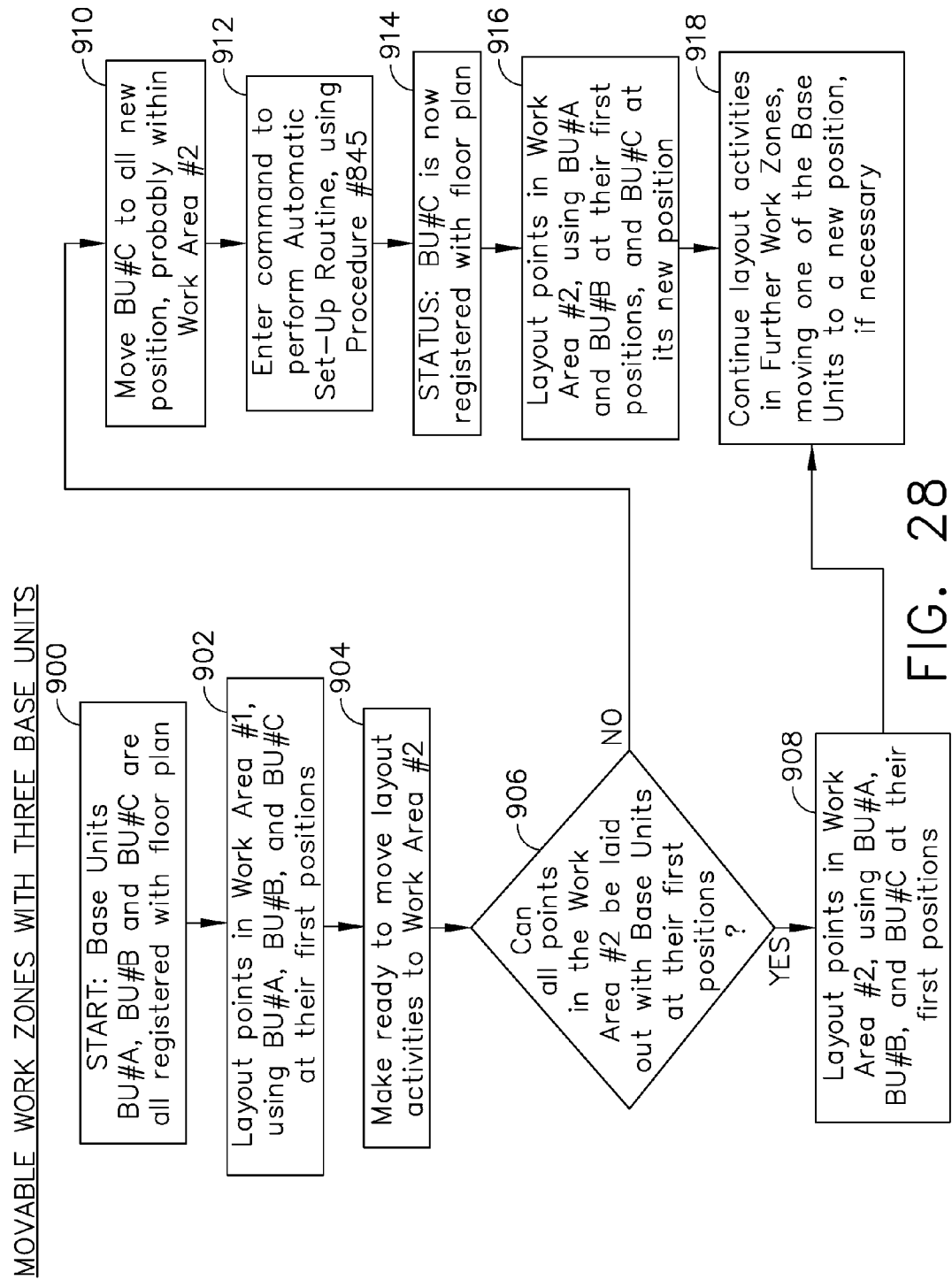
FIG. 28 is a flow chart of some of the important steps performed when moving to new work zones to layout new points, when using three base units of the type depicted in FIG. 21.

Referring now to FIG. 28, a flow chart is provided for showing some of the important steps of a routine for using moveable work zones with three base units. Beginning at a step 900, the status is that there are three base units that are all registered with the floor plan at this particular jobsite. This is similar to the step 850 on FIG. 27. It is also similar to the example scenario presented with reference to FIG. 19 in which there are three base units 230, 240, and 250 already sited on the jobsite floor 202.

In this flow chart of FIG. 28, the base units will be referred to as BU#A, BU#B, and BU#C. The first portion of this procedure is to layout points in a Work Area #1, using all three base units at their first positions on the jobsite floor. This occurs at a step 902.

At a step 904, it is time to make ready to move the layout activities to a Work Area #2. A decision must now be made at a decision step 906: Can all of the points in Work Area #2 be laid out with all three base units at their first positions? If the answer is YES, then the point laying out activities can continue into Work Area #2 using all three base units at their first positions, at a step 908. However, if some or all of the points in Work Area #2 cannot easily be laid out with all three base units at their first positions, then it is time to move one of the base units to a new position.

The next function is to move BU#C to a new position at a step 910. This new position for BU#C will probably be within the Work Area #2. This is similar to the example scenario discussed above in reference to FIG. 20, in which the base unit at 230 was moved to the position 231, while the other two base units at 240 and 250 have remained in their initial positions.

Once Base Unit #C has been placed at a new position, at a step 912 the user enters a command in the remote unit to perform an automatic set-up routine using the procedure 845, which was described in the flow chart of FIG. 26. As will now be understood, at the end of this automatic set-up routine, all three base units will once again be registered with the floor plan, which is the status signified at step 914 on FIG. 28. Thus, it will be understood that the precise physical location where Base Unit #C is moved to is not critical, so long as Base Unit #C is within visible distance of both Base Units #A and #B, and there is a line of sight between all three base units. The user merely has to move the base unit somewhere on the jobsite floor, and then hit a command on the remote unit to perform the automatic set-up routine.

Once Base Unit #C is again registered with the floor plan, the user can now layout points in Work Area #2 at a step 916. In this instance, this layout work is using Base Units #A and #B at their first positions and Base Unit #C at its new position. The user can now continue to layout points in additional work areas and, if necessary, one of the base units can be moved to a new position when entering a new work area for further layout activities. This, of course, can continue over and over at a step 918, so long as at least two base units are left in their existing positions while the third base unit is moved and then re "set-up" to be registered with the floor plan. It will be understood that a fourth base unit could be added to this floor plan layout activity, and it could be set up with any two of the other base units using the automatic set-up routine procedure number 845. In that instance, there could be even more flexibility as to which base unit is then moved to a new position on the jobsite floor, and also more flexibility as to avoiding obstructions during layout activities.

Additional Optional Features

The layout procedure described in the flow chart step 854 of FIG. 27 was referred to as the "best math," for selecting the two best base units for sighting a particular point of interest. Another way of looking at this is to decide which of the two laser light lines are least sensitive to errors. That is a prime consideration for choosing a crossing angle that is not shallow, and one way of determining that is to see if the angle is less than 20 degrees. This is a subjective angle number based on experience, but obviously a crossing angle of 19 degrees is not significantly worse than a crossing angle of 20 or 21 degrees, so there can be some leeway in such decisions. That is one reason that it probably is preferred to allow the user on the jobsite to override automatic calculations by the remote unit, especially if all three base units are fairly close in distance from the point of interest.

Another optional feature would be to create an "error field" of angles and distances in a database stored in the remote unit, for example. Once the three base units are initially positioned on the jobsite floor, the user could then select a number of different points of interest on the virtual floor plan, and have the system automatically calculate the crossing angles and laser light line distances between all three base units and all of these various points of interest. In that way, the user could view the display of the remote unit to quickly go through the error field and review the crossing angles and distances as numeric quantities, which might provide the user with a quick idea as to which points of interest to lay out for a given set of base unit positions.

Another new capability when using at least three base units on a jobsite floor is that, after all three base units are registered on the virtual floor plan, any two laser transmitters can be aimed at the third base unit to visually locate the spin axis of that third base unit. By having two laser planes aiming at the spin axis of the third base unit, this provides a visible plumb line pointer capability without using an actual plumb line pointer device. This visual plumb line would exist both above and below the actual base unit device, which can be useful, especially if that base unit is resting on a pedestal, such as a tripod. The user can take a piece of paper or other solid material to find that visible plumb line and then lay out points directly above or below that spin axis of the third base unit, as desired.

Another capability of a system using three base units is that two of the base units can be aimed at the floor area beneath the third base unit that is sitting on a pedestal. With regard to the example on FIG. 1, one can see that the base units sitting on a pedestal will produce laser light lines 22 and 24 from the base unit 20. As can be seen on FIG. 1, the fan beam cannot reach the area directly underneath that base unit sitting on the pedestal at 20. If the pedestal is three (3) or four (4) feet tall, then there is typically about a five (5) foot radius in which the bottom laser light line 24 does not reach the floor around the pedestal base unit 20. However, if there are two other base units set up in this system, they can be aimed at any point within that five-foot radius beneath the pedestal of base unit 20 (except behind the base unit 20) to literally show points of interest underneath that base unit. This cannot be done unless there are at least three base units.

Another capability, or more properly referred to as an "enhancement," is that the automatic re-benching provided when moving a third base unit to a new position typically will have superior accuracy as compared to any manual benching procedure. For example, if a system has only two base units, and one of them needs to be moved to a new position to continue point layout activities, then that base unit must then be "re-benched" to at least two control points. Although the Trimble base units provide great accuracy, there is nevertheless some human error in aiming the two laser light lines so they precisely cross at a control point. This has been measured as being approximately 0.5 millimeters of tolerance with regard to the accuracy of such measurements.

However, once the system of the technology disclosed herein is set up with three laser base units, any one of those three can be moved to a new physical location and the automatic setup procedure described above can be initiated. Once that occurs, all three base units will re-establish alignment axes with respect to each other and, with the existing Trimble base units, the accuracy of that re-establishment can be about ten (10) times greater—in other words, at about 0.05 millimeters accuracy. Moreover, this accuracy is fairly well maintained at varying and increasing distances between base units.

Yet another option involves the methodology for how a user could align a third base unit into a system that already has two base units registered with the virtual floor plan. As discussed above, the preferred methodology is to place the third base unit anywhere on the jobsite floor and enter a command so that the third base unit will automatically align itself with the first two base units that have already been registered with the virtual floor plan. If that procedure is followed, then the third base unit also becomes registered with the floor plan.

One optional methodology is to align the third base unit with only one of the first two base units and, for its second aiming angle, to use one of the control points that already has been identified on this jobsite floor plan. This would have to be something like "manual benching," because the third base unit could not automatically align itself with the control point, but instead its laser plane would have to be manually aimed directly at that control point, by which the user on the jobsite floor would have to decide exactly when that laser light line was crossing that control point on the jobsite floor. As discussed above, while this can be very accurate, it is still somewhat less accurate than an automatic "re-benching" procedure as described above (i.e., the procedure of FIG. 26).

It will be understood that the logical operations described in relation to the flow charts of FIGS. 26-28 can be implemented using sequential logic (such as by using microprocessor technology), or using a logic state machine, or perhaps by discrete logic; it even could be implemented using parallel processors. One preferred embodiment may use a microprocessor or microcontroller (e.g., microprocessor 410) to execute software instructions that are stored in memory cells within an ASIC. In fact, the entire microprocessor (or microcontroller, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the data stored, for example, in memory circuits 412 and 414), or perhaps by a type of memory device not yet invented.

It will also be understood that the precise logical operations depicted in the flow charts of FIGS. 26-28, and discussed above, could be somewhat modified to perform similar, although perhaps not exact, functions without departing from the principles of the technology disclosed herein. The exact nature of some of the decision steps and other commands in these flow charts are directed toward specific future models of sensing and control system devices used with earthmoving equipment (those involving laser receivers or laser transmitters sold by Trimble Navigation Limited, for example) and certainly similar, but somewhat different, steps would be taken for use with other models or brands of sensing or control systems in many instances, with the overall inventive results being the same.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A layout and point transfer system, comprising:
   (a) a first laser controller, including a first laser light transmitter that emits a substantially vertical first laser light plane, a first omni-directional photosensor, a first fine-positioning photosensor, a first processing circuit, a first memory circuit;
   (b) a second laser controller, including a second laser light transmitter that emits a substantially vertical second laser light plane, a second omni-directional photosensor, a second fine-positioning photosensor, a second processing circuit, a second memory circuit; and
   (c) a third laser controller, including a third laser light transmitter that emits a substantially vertical third laser light plane, a third omni-directional photosensor, a third fine-positioning photosensor, a third processing circuit, a third memory circuit;
   wherein:
   (d) after said first and second laser controllers are placed on a physical jobsite surface, said system is configured:
      (i) to establish a first alignment axis between said first and second laser controllers, and
      (ii) to determine first and second locations of said first and second laser controllers on said physical jobsite surface with respect to at least two control points that are also located on said physical jobsite surface; and
   (e) after said third laser controller is placed on said physical jobsite surface, said system is configured:
      (i) to establish a second alignment axis between said first and third laser controllers,
      (ii) to establish a third alignment axis between said second and third laser controllers, and
      (iii) to determine a third location of said third laser controller on said physical jobsite surface with respect to said first and second laser controllers, based on said second and third alignment axes.

2. The system of claim 1, further comprising:
   (a) at said first laser controller, a first communications circuit, a first aiming angle sensor to measure a bearing angle of said first laser light transmitter, and a first input/output interface circuit that transfers data between at least said first communications circuit and said first processing circuit;
   (b) at said second laser controller, a second communications circuit, a second aiming angle sensor to measure a bearing angle of said second laser light transmitter, and a second input/output interface circuit that transfers data between at least said second communications circuit and said second processing circuit; and (c) at said third laser controller, a third communications circuit, a third aiming angle sensor to measure a bearing angle of said third laser light transmitter, and a third input/output interface circuit that transfers data between at least said third communications circuit and said third processing circuit;

wherein, said first, second, and third communications circuits allow messages to be transferred between said first, second, and third laser controllers, so that commands and data can be sent and received.

3. The system of claim 2, wherein:

said transferred commands and data are used to control aiming of the respective laser light planes of said first, second, and third laser controllers so that, during the establishing of an alignment axis between any two of said first, second, and third laser controllers:
  (i) a first one of said respective laser light planes becomes directly aimed at a spin axis of a second one of said first, second, and third laser controllers; and
  (ii) a second one of said respective laser light planes becomes directly aimed at a spin axis of a first one of said first, second, and third laser controllers.

4. The system of claim 2, wherein:

said first alignment axis is automatically established by a scanning procedure, using said first and second omni-directional photosensors and said first and second fine-positioning photosensors:
  (i) to find a first bearing angle of said second laser controller as viewed from said first laser controller;
  (ii) to find a second bearing angle of said first laser controller as viewed from said second laser controller; and
  (iii) to calculate a first distance between said first and second laser controllers, using said first and second bearing angles.

5. The system of claim 4, wherein:

said first and second laser controllers each become registered with a virtual floor plan by using a set-up procedure that involves said first alignment axis and said at least two control points.

6. The system of claim 5, wherein:

said second and third alignment axes are automatically established in a scanning procedure, by using said first, second, and third omni-directional photosensors, and said first, second, and third fine-positioning photosensors:
(a) to find a third bearing angle of said third laser controller as viewed from said first laser controller;
(b) to find a fourth bearing angle of said first laser controller as viewed from said third laser controller;
(c) to find a fifth bearing angle of said third laser controller as viewed from said second laser controller;
(d) to find a sixth bearing angle of said second laser controller as viewed from said third laser controller; and
(e) to calculate a second distance between said first and third laser controllers, and to calculate a third distance between said second and third laser controllers, using said third, fourth, fifth, and sixth bearing angles, and using a registered first position of said first laser controller on said physical jobsite surface and a registered second position of said second laser controller on said physical jobsite surface.

7. The system of claim 2, further comprising:

(a) a remote controller including a fourth processing circuit, a fourth memory circuit, a fourth communications circuit, a fourth input/output interface circuit that transfers data between at least said fourth communications circuit and said fourth processing circuit, a visible display, and a data entry circuit; and (b) a virtual floor plan that is stored in said fourth memory circuit;

wherein:

(c) said remote controller includes an executable computer program to perform at least one of the following functions:
  (i) to communicate with said first, second, and third communications circuits at said first, second, and third laser controllers, respectively;
  (ii) to transfer commands and data messages with said first, second, and third laser controllers;
  (iii) to control said first, second, and third laser controllers to perform set-up routines, as desired, under the control of a user;
  (iv) to receive data messages from said first, second, and third laser controllers so as to determine physical locations of said first, second, and third laser controllers on said physical jobsite surface, and to determine physical locations of points of interest during a point layout procedure;
  (v) using said determined physical locations, to register positions of said first, second, and third laser controllers on said virtual floor plan; and
  (vi) using said determined physical locations, to register positions of said points of interest on said virtual floor plan, as desired by said user.

8. The system of claim 7, wherein:

after all of said first, second, and third laser controllers are registered with said virtual floor plan, to perform a new set-up procedure after one of said first, second, and third laser controllers is moved to a new location on said physical jobsite surface, by:
(a) said user entering a command on said remote controller data entry circuit to automatically create a new set of alignment axes between the moved one of said first, second, and third laser controllers and the other two of the first, second, and third laser controllers that were not moved;
(b) determining a new physical location of the moved one of said first, second, and third laser controllers on said physical jobsite surface, based upon said new set of alignment axes; and
(c) using said new physical location, to register a position of the moved one of said first, second, and third laser controllers on said virtual floor plan.

9. The system of claim 7, wherein:

during a point layout procedure, to determine which two of said first, second, and third laser controllers should be used to layout a particular point of interest by performing at least one of the following analyses:
(a) analyzing three laser light lines, one from each of said first, second, and third laser light planes, to said particular point of interest, and determining which of said three laser light lines is most sensitive to error, then automatically turning off the corresponding laser light transmitter which emitted that specific laser light line most sensitive to error; or
(b) analyzing three laser light lines, one from each of said first, second, and third laser light planes, to said particular point of interest, and determining which of said three laser light lines is blocked by an obstruction, then using said other two laser light lines that are not blocked by said obstruction; or (c) emitting three laser light lines, one from each of said first, second, and third laser light planes, to said particular point of interest, allowing said user to manually determine which of said three laser light lines is least desirable, then allowing said user to manually enter a command to turn off the laser light transmitter which emitted that specific least desirable laser light line.

10. A method for using a layout and point transfer system, said method comprising:

(a) providing a first laser controller, including a first laser light transmitter that emits a substantially vertical first laser light plane, a first omni-directional photosensor, a first fine-positioning photosensor, a first processing circuit, a first memory circuit;

(b) providing a second laser controller, including a second laser light transmitter that emits a substantially vertical second laser light plane, a second omni-directional photosensor, a second fine-positioning photosensor, a second processing circuit, a second memory circuit;

(c) providing a third laser controller, including a third laser light transmitter that emits a substantially vertical third laser light plane, a third omni-directional photosensor, a third fine-positioning photosensor, a third processing circuit, a third memory circuit;

(d) after said first and second laser controllers are placed on a physical jobsite surface:
  (i) establishing a first alignment axis between said first and second laser controllers, and
  (ii) determining first and second locations of said first and second laser controllers on said physical jobsite surface with respect to at least two control points that are also located on said physical jobsite surface; and (e) after said third laser controller is placed on said physical jobsite surface:
  (i) establishing a second alignment axis between said first and third laser controllers,
  (ii) establishing a third alignment axis between said second and third laser controllers, and
  (iii) determining a third location of said third laser controller on said physical jobsite surface with respect to said first and second laser controllers, based on said second and third alignment axes.

11. The method of claim 10, further comprising the steps of:

(a) at said first laser controller, providing a first communications circuit, a first aiming angle sensor to measure a bearing angle of said first laser light transmitter, and a first input/output interface circuit that transfers data between at least said first communications circuit and said first processing circuit;

(b) at said second laser controller, providing a second communications circuit, a second aiming angle sensor to measure a bearing angle of said second laser light transmitter, and a second input/output interface circuit that transfers data between at least said second communications circuit and said second processing circuit;

(c) at said third laser controller, providing a third communications circuit, a third aiming angle sensor to measure a bearing angle of said third laser light transmitter, and a third input/output interface circuit that transfers data between at least said third communications circuit and said third processing circuit; and (d) transferring messages between said first, second, and third laser controllers, for sending and receiving commands and data therebetween.

12. The method of claim 11, further comprising the steps of:

(a) using said transferred commands and data to control aiming of the respective laser light planes of said first, second, and third laser controllers, and (b) establishing an alignment axis between any two of said first, second, and third laser controllers by: (i) directly aiming a first one of said respective laser light planes at a spin axis of a second one of said first, second, and third laser controllers; and (ii) directly aiming a second one of said respective laser light planes at a spin axis of a first one of said first, second, and third laser controllers.

13. The method of claim 11, further comprising the steps of:

automatically establishing said first alignment axis by a scanning procedure, using said first and second omni-directional photosensors and said first and second fine-positioning photosensors, by:
(a) finding a first bearing angle of said second laser controller as viewed from said first laser controller;
(b) finding a second bearing angle of said first laser controller as viewed from said second laser controllers; and
(c) calculating a first distance between said first and second laser controllers, using said first and second bearing angles.

14. The method of claim 13, further comprising the steps of registering said first and second laser controllers each with a virtual floor plan by using a set-up procedure involving said first alignment axis and said at least two control points.

15. The method of claim 14, further comprising the steps of:

automatically establishing said second and third alignment axes by way of a scanning procedure, using said first, second, and third omni-directional photosensors, and said first, second, and third fine-positioning photosensors, by:
(a) finding a third bearing angle of said third laser controller as viewed from said first laser controller;
(b) finding a fourth bearing angle of said first laser controller as viewed from said third laser controller;
(c) finding a fifth bearing angle of said third laser controller as viewed from said second laser controller;
(d) finding a sixth bearing angle of said second laser controller as viewed from said third laser controller; and
(e) calculating a second distance between said first and third laser controllers, and calculating a third distance between said second and third laser controllers, using said third, fourth, fifth, and sixth bearing angles, and using a registered first position of said first laser controller on said physical jobsite surface and a registered second position of said second laser controller on said physical jobsite surface.

16. The method of claim 11, further comprising the steps of:

(a) providing a remote controller including a fourth processing circuit, a fourth memory circuit, a fourth communications circuit, a fourth input/output interface circuit that transfers data between at least said fourth communications circuit and said fourth processing circuit, a visible display, and a data entry circuit; and (b) storing a virtual floor plan in said fourth memory circuit;
(c) running an executable computer program at said remote controller, thereby performing at least one of the following steps:
  (i) communicating with said first, second, and third communications circuits at said first, second, and third laser controllers, respectively;
  (ii) transferring commands and data messages with said first, second, and third laser controllers;
  (iii) controlling said first, second, and third laser controllers to perform set-up routines, as desired, under the control of a user;
  (iv) receiving data messages from said first, second, and third laser controllers so as to determine physical locations of said first, second, and third laser controllers on said physical jobsite surface, and to determine physical locations of points of interest during a point layout procedure;
  (v) using said determined physical locations, registering positions of said first, second, and third laser controllers on said virtual floor plan; and
  (vi) using said determined physical locations, to registering positions of said points of interest on said virtual floor plan, as desired by said user.

17. The method of claim 16, further comprising the steps of:
  determining, during a point layout procedure, which two of said first, second, and third laser controllers should be used to layout a particular point of interest by performing at least one of the following analyses:
  (a) analyzing three laser light lines, one from each of said first, second, and third laser light planes, to said particular point of interest, and determining which of said three laser light lines is most sensitive to error, then automatically turning off the corresponding laser light transmitter which emitted that specific laser light line most sensitive to error; or
  (b) analyzing three laser light lines, one from each of said first, second, and third laser light planes, to said particular point of interest, and determining which of said three laser light lines is blocked by an obstruction, then using said other two laser light lines that are not blocked by said obstruction; or
  (c) emitting three laser light lines, one from each of said first, second, and third laser light planes, to said particular point of interest: (i) manually determining which of said three laser light lines is least desirable, and (ii) manually entering a command to turn off the laser light transmitter which emitted that specific least desirable laser light line.

18. The method of claim 16, further comprising the steps of:
  after all of said first, second, and third laser controllers are registered with said virtual floor plan, performing a new set-up procedure after one of said first, second, and third laser controllers is moved to a new location on said physical jobsite surface, by:
  (a) entering a command on said remote controller data entry circuit to automatically create a new set of alignment axes between the moved one of said first, second, and third laser controllers and the other two of the first, second, and third laser controllers that were not moved;
  (b) determining a new physical location of the moved one of said first, second, and third laser controllers on said physical jobsite surface, based upon said new set of alignment axes; and
  (c) using said new physical location, registering a position of the moved one of said first, second, and third laser controllers on said virtual floor plan.

19. The method of claim 18, further comprising the steps of:
  after said moved one of said first, second, and third laser controllers has been registered on said virtual floor plan, laying out new points of interest in a different area of said physical jobsite surface that was not accessible to all three of said first, second, and third laser controllers when positioned at their previous locations on said physical jobsite surface.

20. A method for using a layout and point transfer system, said method comprising:
  (a) providing a first laser controller, including a first laser light transmitter that emits a substantially vertical first laser light plane, a first omni-directional photosensor, a first fine-positioning photosensor, a first processing circuit, a first memory circuit;
  (b) providing a second laser controller, including a second laser light transmitter that emits a substantially vertical second laser light plane, a second omni-directional photosensor, a second fine-positioning photosensor, a second processing circuit, a second memory circuit;
  (c) providing a third laser controller, including a third laser light transmitter that emits a substantially vertical third laser light plane, a third omni-directional photosensor, a third fine-positioning photosensor, a third processing circuit, a third memory circuit;
  (d) after said first and second laser controllers are placed on a physical jobsite surface:
    (i) establishing a first alignment axis between said first and second laser controllers, and
    (ii) determining first and second locations of said first and second laser controllers on said physical jobsite surface with respect to at least two control points that are also located on said physical jobsite surface; and
  (e) after said third laser controller is placed on said physical jobsite surface:
    (i) aiming said third laser light transmitter at a spin axis of said first laser controller, and establishing a second alignment axis between said first and third laser controllers;
    (ii) aiming said third laser light transmitter at a selected one of said at least two control points; and
    (iii) determining a third location of said third laser controller on said physical jobsite surface with respect to said first laser controller based on said second alignment axis, and with respect to said selected one of said at least two control points.

* * * * *